US011870862B2

(12) United States Patent
Brett et al.

(10) Patent No.: US 11,870,862 B2
(45) Date of Patent: Jan. 9, 2024

(54) STATE PREDICTION OF DEVICES

(71) Applicant: Amazon Technologies, Inc., Seattle, WA (US)

(72) Inventors: Charles Edwin Ashton Brett, Seattle, WA (US); Sara Parker Hillenmeyer, Seattle, WA (US); Sven Eberhardt, Seattle, WA (US); William Evan Welbourne, Seattle, WA (US); Aniruddha Basak, Seattle, WA (US); Lizhen Peng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 983 days.

(21) Appl. No.: 16/133,308

(22) Filed: Sep. 17, 2018

(65) Prior Publication Data

US 2020/0090068 A1   Mar. 19, 2020

(51) Int. Cl.
| | |
|---|---|
| *G06F 3/0484* | (2022.01) |
| *H04L 67/50* | (2022.01) |
| *G06N 5/047* | (2023.01) |
| *G06F 18/2413* | (2023.01) |
| *G06N 7/01* | (2023.01) |

(52) U.S. Cl.
CPC .......... *H04L 67/535* (2022.05); *G06F 3/0484* (2013.01); *G06F 18/2413* (2023.01); *G06N 5/047* (2013.01); *G06N 7/01* (2023.01)

(58) Field of Classification Search
CPC .......... G06N 7/005; G06N 5/047; G06N 7/01; G06F 3/0484; G06F 18/2413; G06K 9/627; H04L 67/22; H04L 67/535

USPC ........................................................ 706/20
See application file for complete search history.

(56) References Cited

U.S. PATENT DOCUMENTS

| | | | |
|---|---|---|---|
| 8,950,686 B2 * | 2/2015 | Matsuoka | F24F 11/61 236/46 C |
| 9,092,802 B1 * | 7/2015 | Akella | G06Q 30/0256 |
| 9,298,196 B2 * | 3/2016 | Matsuoka | F24F 11/46 |
| 9,319,993 B1 * | 4/2016 | Urbanus | H04W 52/0258 |
| 9,466,286 B1 | 10/2016 | Hart et al. | |
| 10,219,202 B1 * | 2/2019 | Malasani | H04W 4/30 |
| 10,397,013 B1 * | 8/2019 | Hill | H04L 67/36 |
| 11,115,289 B1 * | 9/2021 | Haefner | H04L 63/1425 |
| 11,195,398 B1 * | 12/2021 | Fu | G06V 20/52 |

(Continued)

OTHER PUBLICATIONS

Taylor Martin; How to connect Lifx bulbs to Google Home; Mar. 28, 2017; cnet.com; pp. 1-7.*

(Continued)

*Primary Examiner* — Andrew R Dyer
(74) *Attorney, Agent, or Firm* — Lee & Hayes, P.C.

(57) ABSTRACT

Systems and methods for state prediction of devices are disclosed. A group of reference devices may be identified and a subset of the reference devices may be identified and/or determined based at least in part on a degree of similarity between reference usage-patterns associated with the reference devices and a usage pattern of a target device. The current state of the subset of the reference devices may be determined and may be utilized to determine a probability that the target device should be in a given state. The state prediction information may be utilized for one or more actions, such as sending recommendations, target inference operations, and/or device configuration, for example.

20 Claims, 10 Drawing Sheets

(56) References Cited

U.S. PATENT DOCUMENTS

| | | | |
|---|---|---|---|
| 11,334,034 B2* | 5/2022 | Matsuoka | F24F 11/70 |
| 2009/0043692 A1* | 2/2009 | Pippuri | H04L 65/60 |
| | | | 705/39 |
| 2011/0239011 A1* | 9/2011 | Waris | H04L 67/2861 |
| | | | 713/323 |
| 2014/0316584 A1* | 10/2014 | Matsuoka | G05B 15/02 |
| | | | 700/278 |
| 2014/0317029 A1* | 10/2014 | Matsuoka | G05D 23/1919 |
| | | | 706/12 |
| 2014/0376405 A1* | 12/2014 | Erickson | H04L 69/165 |
| | | | 370/254 |
| 2015/0244664 A1* | 8/2015 | Kendal | H04W 4/12 |
| | | | 709/206 |
| 2015/0370621 A1* | 12/2015 | Karp | H04L 12/282 |
| | | | 719/328 |
| 2015/0373149 A1* | 12/2015 | Lyons | G05B 13/04 |
| | | | 709/203 |
| 2016/0048370 A1* | 2/2016 | Zenoff | G06F 1/1652 |
| | | | 715/734 |
| 2016/0085396 A1* | 3/2016 | Pendlay | G06F 3/0484 |
| | | | 715/761 |
| 2016/0098468 A1* | 4/2016 | Logue | H04L 12/2825 |
| | | | 707/756 |
| 2016/0134932 A1* | 5/2016 | Karp | H04L 67/12 |
| | | | 348/207.11 |
| 2016/0142407 A1* | 5/2016 | Chun | H04L 63/0861 |
| | | | 726/5 |
| 2016/0260135 A1* | 9/2016 | Zomet | H04L 67/535 |
| 2016/0342906 A1 | 11/2016 | Shaashua et al. | |
| 2016/0357539 A1* | 12/2016 | Siracusa | H04L 67/14 |
| 2017/0127501 A1* | 5/2017 | Isaacs | B25F 5/02 |
| 2017/0160881 A1* | 6/2017 | Kanemoto | G06F 3/0482 |
| 2019/0019504 A1* | 1/2019 | Hatambeiki | G10L 15/22 |
| 2019/0066672 A1* | 2/2019 | Wood | H04L 67/1014 |
| 2019/0066687 A1* | 2/2019 | Wood | G10L 15/22 |
| 2019/0132205 A1* | 5/2019 | Du | H04L 41/0893 |
| 2020/0098354 A1* | 3/2020 | Lin | G10L 15/22 |
| 2021/0295838 A1* | 9/2021 | Kwon | G06F 3/16 |

OTHER PUBLICATIONS

Chen et al.; An Efficient Recommendation Filter Model on Smart Home Big Data Analytics for Enhanced Living Environments; Sensors 2016, 16, 1706; pp. 1-26.*

"Recommendation;" Dec. 26, 2017; dictionary.com; pp. 1-3.*

"Schedule;" Nov. 28, 2017; collinsdictionary.com; pp. 1-4.*

PCT Search Report ad Written Opinion dated Dec. 4, 2019 for PCT Application No. PCT/US2019/051352, 11 pages.

* cited by examiner

STATE PREDICTION OF DEVICES

BACKGROUND

Smart-home devices have become ubiquitous. Users may activate and/or deactivate these devices during certain times of the day and/or days of the week. The ability to understand usage patterns of such smart-home devices may be desired. Described herein are improvements in technology and solutions to technical problems that can be used to, among other things, better understand and utilize usage patterns of smart-home devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
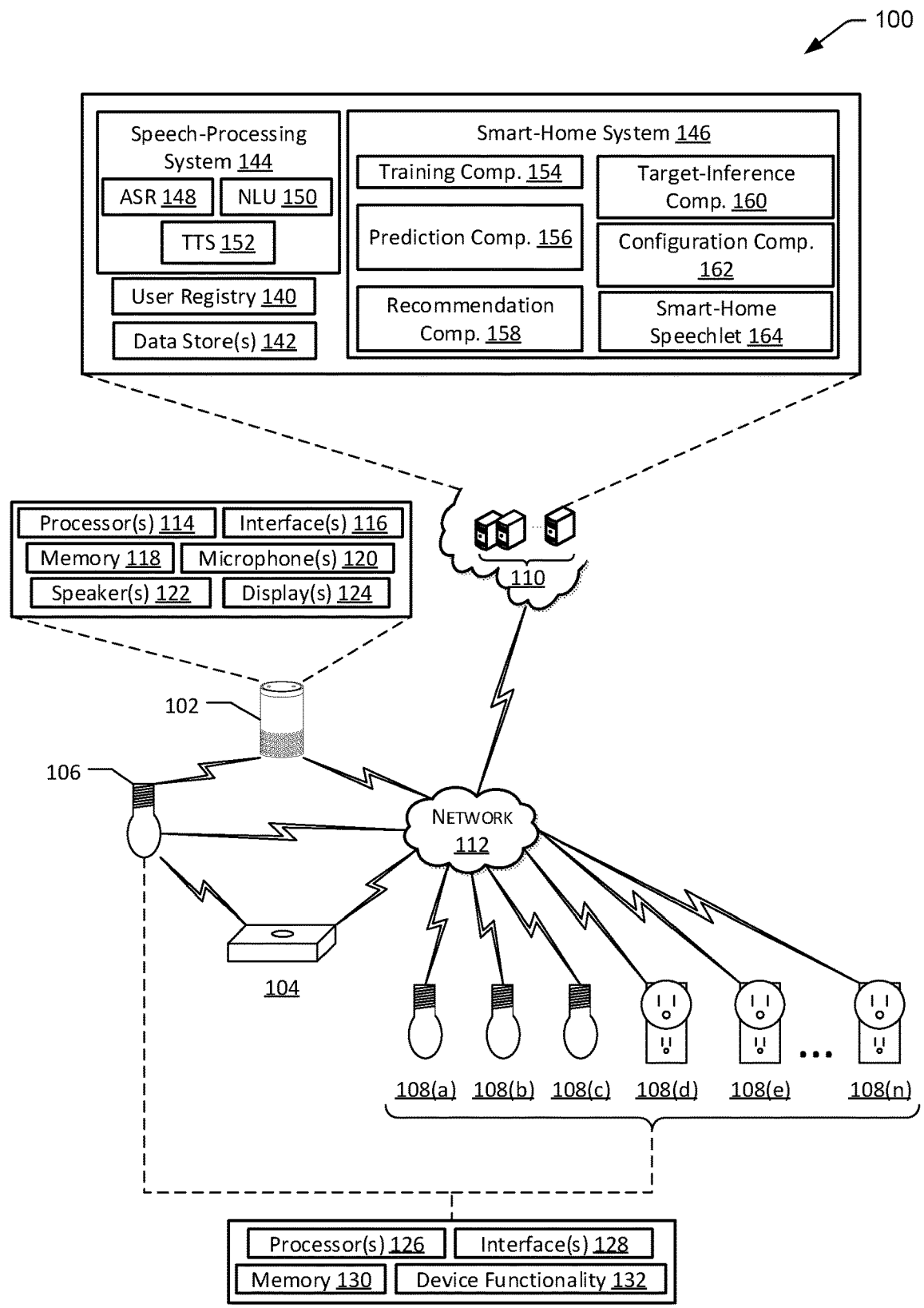
FIG. 1 illustrates a schematic diagram of an example environment for state prediction of devices.

Systems and methods for state prediction of devices are disclosed. Take, for example, a space, such as a home, that includes one or more smart accessory devices, such as light bulbs, plugs, locks, cameras, televisions, appliances, doorbells, security systems, etc. A user may control the state of these devices using tactile input on the devices themselves, by providing input to a personal device, such as a mobile phone, and/or by providing voice commands to the accessory device and/or to a voice-enabled device associated with the accessory device. Device states may include, for example, the device being on, off, activated, deactivated, in a standby mode, in an "away mode," etc. For example, a user may have a smart light bulb accessory device located in a bedroom along with a voice-enabled device. The user may speak a user utterance such as "turn on bedroom light," and microphones of the voice-enabled device may capture audio corresponding to the user utterance and may generate audio data. The audio data may be sent to a remote system for speech processing. The remote system may send directive data back to the voice-enabled device, and/or the accessory device and/or a hub device, representing an instruction to change the state of the accessory device from an "off" state to an "on" state. In this example, the components of the accessory device that cause light to be emitted therefrom may be activated and the "bedroom light" may be turned on. In other examples, the user may provide a tactile input to the accessory device and/or an appliance, such as a lamp, to which the light is coupled, and/or the user may utilize an application residing on and/or accessible to a personal device to request that the "bedroom light" be turned on.

In addition to the functionality described above, it may be advantageous to predict when a given accessory device should be in a given state. For example, a user may desire to know when an accessory device was mistakenly left on when it should be off, and/or when an accessory device such as a lock is in an "unlocked" state when it should be in a "locked" state. Additionally, or alternatively, in examples where a user speaks a user utterance requesting to change the state of an accessory device and the remote system cannot determine which of several accessory devices to operate, it may be beneficial to determine which accessory devices are typically operated at the time of the request. Additionally, or alternatively, in examples where a user desires to configure a state-change schedule for an accessory device, it may be advantageous to understand when state changes should be scheduled for the accessory device. For these and other examples, including those described more fully herein, predicting the state of a device may be beneficial.

For example, a remote system may identify, determine, and/or generate usage-pattern data associated with an accessory device. The usage-pattern data may indicate a usage pattern of the accessory device over a period of time, such as, for example, a three-month period of time. For example, an accessory device, such as a smart light bulb, may undergo state changes during the period of time, such as being turned on and off. Data indicating the occurrence of these state changes, the character of the state changes, such as transitioning from on to off or from off to on, and/or the time of day and/or day of the week of the state changes may be generated and stored in one or more data stores. The remote system may utilize this usage-pattern data to determine the usage pattern of the accessory device over the period of time. By way of example and not as a limitation, the remote system may generate usage-pattern data indicating that, for a smart light bulb accessory device associated with a given user account, the accessory device is transitioned from an "off" state to an "on" state at or around 4:30 am on weekdays 90% of the time, then the device is transitioned from the "on" state to the "off" state at or around 6:30 am on weekdays 93% of the time, then the device is transitioned from the "off" state to the "on" state at or around 7:30 pm on weekdays 95% of the time, and then the device is transitioned from the "on" state to the "off" state at or around 9:30 pm on weekdays 75% of the time. This usage pattern may be utilized for the analyses described below.

The remote system may also identify an initial group of reference devices from which to analyze reference usage patterns. In examples, the group of reference devices may be random, may include all or only a portion of accessory devices associated with the remote system, and/or may be selected using one or more criteria. For example, accessory devices may be identified as reference devices based at least in part on the geolocation of the devices, the device type such as light, plugin, lock, camera, etc., scheduling data associated with the accessory devices, and/or contextual data showing one or more similarities between the target accessory device and reference devices and/or user accounts associated with the target accessory device and the reference devices. By way of example and not as a limitation, the remote system may identify 100,000 reference devices based at least in part on the criteria that the reference devices have the same or a similar device type as the target device. Using the example provided herein, the target accessory device may be a smart light bulb. As such, the remote system may identify reference devices that have the same light bulb device type and/or that have similar device types such as a wall plugin and/or a lamp.

Additionally, the remote system may generate reference usage-pattern data for some or all of the reference devices. For example, similar to the target accessory device, the reference devices may be operated over the period of time and data indicating the transition of states for the reference devices may be identified, determined, and/or generated and stored. The remote system may analyze the reference usage-pattern data for the reference devices with respect to the usage-pattern data associated with the target device to determine a subset of the group of reference devices that has a high degree of usage similarity. Using the example provided above, the remote system may identify the 100 reference devices with reference usage patterns that are most similar to the usage pattern of the target device. Additionally, or alternatively, the remote system may identify the reference devices, regardless of number, with reference usage patterns that have a degree of similarity that is at least a threshold degree of similarity with the usage pattern of the target device.

The remote system may then utilize the subset of the reference devices to predict the current state of the target device. For example, at a given time, the remote system may determine a state of some or all of the reference devices in the subset of the reference devices. In examples, a database may maintain the current state of reference devices and that database may be queried to identify the current state of the reference devices in the subset of reference devices. In the example utilized herein, the reference devices may be associated with either an "on" state or an "off" state. Using the database indicating the current state of devices, the remote system may determine that a first number of the subset of the reference devices is in the "on" state and that a second number of the subset of the reference devices is in the "off" state. By way of example, the remote system may determine, at 10:00 pm on a Wednesday, that 98 of the 100 reference devices in the subset of reference devices is in the "off" state, and the remote system may determine that 2 of the 100 reference devices in the subset of the reference devices is in the "on" state at that time and day. Based at least in part on the number of the reference devices that are in the "on" state and the number of the reference devices that are in the "off" state, the remote system may determine a probability value that the target accessory device should be in a given state. Using the example provided herein, the remote system may determine that there is a 98% probability that the target device should be in the "off" state at 10:00 pm on the Wednesday in question.

In examples, the reference devices may be associated with user accounts other than the user account associated with the target accessory device. In other examples, the reference devices may be associated with the same user account as the target accessory device. In still other examples, the reference devices may include accessory devices associated with their own user accounts and the target device may be associated with a communal space, such as a thermometer located in a hotel room. In these and other examples, user accounts and reference device groups may be changed and/or selected to facilitate state prediction for a given use case.

The state prediction described herein may then be utilized for one or more applications. For example, if the remote system determines that the probability the target device should be in an "off" state is at least a threshold probability, but the current state of the target device is in the "on" state, notification data may be sent from the remote system to the voice-enabled device and/or the personal device and/or the accessory device. The notification data may indicate the current state of the target device and may provide a recommendation that the state be changed. Additionally, or alternatively, directive data may be sent from the remote system to the voice-enabled device, the personal device, and/or the target device to transition the state of the device.

Additionally, or alternatively, the state prediction operations described herein may be performed based at least in part on receiving, at the remote system and from a voice-enabled device, audio data representing a user utterance to operate an accessory device. In examples, the remote system may attempt to determine which accessory device to operate in light of the user utterance. For example, the user utterance may include "turn on study light." The user, the remote system, and/or a third-party system may have given naming indicators to accessory devices associated with the voice-enabled device. However, in this example, none of the naming indicators may be "study light." As such, the remote system may perform target inference operations to identify which of the multiple accessory devices is most likely to be the "study light." The target inference operations may include determining which accessory device is most likely in the "on" state at the time the audio data was received by the remote system. For example, the remote system may determine that 1% of reference devices associated with a first accessory device with the naming indicator of "kitchen light" are in the "off" state. The remote system may further determine that 50% of reference devices associated with a second accessory device with the naming indicator of "bedroom light" are in the "on" state. The remote system may further determine that 97% of reference devices associated with a third accessory device with the naming indicator of "office light" are in the "on" state. Based at least in part on this analysis, the remote system may determine that the third accessory device is most likely the accessory device the user desires to operate.

Additionally, or alternatively, the state prediction operations described herein may be utilized when configuring an accessory device for scheduled state changes. For example, a user may desire to set a schedule for an accessory device to be activated and deactivated during, for example, a given day. While a user may manually set such a schedule, the user may additionally, or alternatively, desire to automatically set a schedule based on typical usage patterns for the accessory device. To do so, the state prediction analysis described above may be utilized to determine when state changes generally occur for the subset of the reference devices. Scheduling data indicating the schedule of such state changes may be generated and a recommendation indicating the schedule may be sent to the voice-enabled device and/or the personal device associated with the user to configure the accessory device for scheduled state changes utilizing the schedule. Based at least in part on receive input data representing an acceptance of the recommendation, the remote system and/or the voice-enabled device and/or the personal device may configure the accessory device using the schedule.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for state prediction of devices. The system 100 may include, for example, a voice-enabled device 102. The voice-enabled device 102 may be configured to receive user utterances and perform operations in response to such user utterances. In these examples, the voice-enabled device 102 may be "hands free" such that interactions with the devices are performed through audible requests and responses.

The system 100 may also include a hub device 104. The hub device 104 may be referred to as a "home controller," gateway and/or other type of "hub," and may assist in controlling associated smart-home devices. In examples, smart devices may be paired to the hub device, typically by following instructions to physically place the smart device and the hub device 104 into a join mode, which may also be described as a pairing mode, and/or by utilizing a hub-associated application stored on and/or accessed by a web and/or mobile phone. Thereafter, the hub device 104 may be utilized to control operations associated with the smart device. In examples, the hub device 104 may be the voice-enabled device 102 and/or may be a component of the voice-enabled device 102.

The system 100 may also include one or more target accessory devices 106 and one or more reference accessory devices 108(a)-108(n). The accessory devices 106, 108(a)-(n) may be described as "smart" devices, which may have certain computing components and be configured to send and/or receive data from other devices. The accessory devices 106, 108(a)-(n) may be, for example, light bulbs, plugs, locks, televisions, appliances, doorbells, cameras, etc. The target accessory device 106 may be "paired" or otherwise associated with the voice-enabled device 102, the hub device 104, and/or a user account. As such, the target accessory device 106 may be configured to send data to and/or receive data from the voice-enabled devices 102. The reference accessory device 108(a)-(n) may be associated with one or more other user accounts and may be located in spaces other than the space in which the target accessory device 106 is located. For example, the target accessory device 106 may be located in a home along with the voice-enabled device 102 and/or the hub device 104, while the reference accessory devices 108(a)-(n) may be located in different homes or other spaces and may be associated with their own voice-enabled devices and/or hub devices. In other examples, the target accessory device 106 may be located in the same space as the reference accessory devices 108(a)-(n).

The voice-enabled device 102, the hub device 104, the target accessory device 106, and/or the reference accessory devices 108(a)-(n) may be configured to send data to and/or receive data from a remote system 110, such as via a network 112. In examples, one or more of the components of the system 100 may communicate directly with the remote system 110, via the network 112. In other examples, one or more of the accessory devices 106, 108(a)-(n) may communicate with the voice-enabled device 102, and the voice-enabled device 102 may communicate with the remote system 110. Additionally, a personal device, such as a mobile phone, associated with the voice-enabled device 102 may communicate directly with the voice-enabled device 102, the accessory devices 106, 108(a)-(n), and/or the remote system 110.

The voice-enabled device 102 may include one or more components, such as, for example, one or more processors 114, one or more network interfaces 116, memory 118, one or more microphones 120, one or more speakers 122, and/or one or more displays 124. The microphones 120 may be configured to capture audio, such as user utterances, and generate corresponding audio data. The speakers 122 may be configured to output audio, such as audio corresponding to audio data received from another device and/or the remote system 110. The displays 124 may be configured to present images, such as images corresponding to image data received from another device and/or the remote system 110.

The accessory devices 106, 108(a)-(n) may include one or more components, such as, for example, one or more processors 126, one or more network interfaces 128, memory 130, and/or device functionality components 132. The memory 130 and/or processors 126 may be utilized to cause certain operations to be performed by the accessory devices 106, 108(a)-(n), such as activating and/or deactivating the device functionality components 132. The device functionality components 132 may include components associated with the intended use of the accessory devices 106, 108(a)-(n). For example, the target accessory device 106 may be a light bulb, and in this example, the device functionality components 132 may include a filament and/or light emitting diode that may produce and/or emit light. By way of further example, the reference accessory device 108(d) may be a wall plug, and in this example, the device functionality components 132 may include an "on/off mechanism" for causing electricity to flow or not flow to a device that is plugged in to the wall plug. It should be noted that the device functionality components 132 illustrated here are by way of example only.

The personal device, which is not depicted, may include one or more components such as one or more applications residing on memory of the personal device and/or residing elsewhere, such as with the remote system, and may be accessible via the personal device. The applications may be configured to cause processors of the personal device to display one or more user interfaces associated with operations of the voice-enabled device 102 and/or the accessory devices 106, 108(a)-(n). The user interfaces may be utilized to receive inputs from the user of the personal device and/or to provide content to the user.

The remote system 110 may include components such as, for example, a user registry 140, one or more data stores 142, a speech-processing system 144, and/or a smart-home system 146. The speech-processing system 144 may include an automatic speech recognition (ASR) component 148, a natural language understanding (NLU) component 150, and/or a text-to-speech (TTS) component 152. The smart-home system 146 may include a training component 154, a prediction component 156, a recommendation component 158, a target-inference component 160, a configuration component 162, and/or a smart-home speechlet 164. Each of the components described herein with respect to the remote system 110 may be associated with their own systems, which collectively may be referred to herein as the remote system 110, and/or some or all of the components may be associated with a single system. In examples, some or each of the components of the remote system 110 may include their own processor(s), network interface(s), and/or memory. As such, by way of example, the speech-processing system 144 may include and/or be associated with processor(s), network interface(s), and/or memory. The smart-home system 146 may include and/or be associated with different processor(s), network interface(s), and/or memory, or one or more of these components may utilize some or all of the same processor(s), network interface(s), and/or memory utilized by the speech-processing system 144. These components are described in detail below. Additionally, the operations and/or functionalities associated with and/or described with respect to the components of the remote system 110 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda™ system or similar system, may be utilized.

The user registry component 140 may be configured to identify, determine, and/or generate associations between users, user accounts, and/or devices. For example, one or more associations between user accounts may be identified, determined, and/or generated by the user registry 140. The user registry 140 may additionally store information indicating one or more applications and/or resources accessible to and/or enabled for a given user account. Additionally, the user registry 140 may include information indicating device identifiers, such as naming identifiers, associated with a given user account, as well as device types associated with the device identifiers. The user registry 140 may also include information indicating user account identifiers, naming indicators of devices associated with user accounts, and/or associations between voice-enabled devices 102 and accessory devices 106, 108(a)-(n). It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The data stores 142 may be configured to identify, determine, and/or generate data associated with use of the voice-enabled devices 102 and/or the accessory devices 106, 108(a)-(n). For example, the voice-enabled devices 102 may be utilized to cause the accessory devices 106, 108(a)-(n) to operate. Usage data may be identified, determined, and/or generated that indicates some or each of these interactions. Timing data may also be identified, determined, and/or generated that indicates a time at which some or each of these interactions took place. Device-state data, and/or other usage data may also be identified, determined, and/or generated. It should be understood that while the user registry 140 and the data stores 142 are illustrated as separate components, the user registry 140 and the data stores 142 may be the same component. In other examples, the data stores 142 may be operated and/or maintained by a third-party system other than the remote system 110, and the remote system 110 may have access to the data stores 142.

The remaining components of the remote system 110 that are illustrated in FIG. 1 will be described below by way of an example use case. It should be noted that this use case is provided for illustrative purposes, and not by way of limitation. For example, it may be advantageous to predict when the target accessory device 106 should be in a given state. A user may desire to know when the target accessory device 106 was mistakenly left on when it should be off, and/or when the target accessory device 106 such as a lock is in an "unlocked" state when it should be in a "locked" state. Additionally, or alternatively, in examples where a user speaks a user utterance requesting to change the state of the target accessory device 106 and the remote system 110 cannot determine which of several accessory devices to operate, it may be beneficial to determine which accessory devices are typically operated at the time of the request. Additionally, or alternatively, in examples where a user desires to configure a state-change schedule for the target accessory device 106, it may be advantageous to understand when state changes should be scheduled for the target accessory device 106. In these and other examples, including those described more fully herein, predicting the state of the target accessory device 106 may be beneficial. It should be understood that "states" as used herein may include the specific states utilized as examples and/or the state may include other device states of particular devices and/or representations of devices at a given time. As such, identifying and/or predicting the state of a device may include identifying and/or predicting a characteristic associated with the device at a given time.

For example, the training component 154 may identify, determine, and/or generate usage-pattern data associated with the target accessory device 106. The usage-pattern data may indicate a usage pattern of the target accessory device 106 during a period of time, such as, for example, a three-month period of time. For example, the target accessory device 106 may undergo state changes during the period of time, such as being turned on and off. Data indicating the occurrence of these state changes, the character of the state changes, such as transitioning from on to off or from off to on, and/or the time of day and/or day of the week of the state changes may be identified, determined, and/or generated and stored, such as in the data store(s) 142. The training component 154 may utilize this usage-pattern data to determine the usage pattern of the target accessory device 106 over the period of time. It should be understood that while the period of time has been described as three months, that time frame is provided by way of illustration only and not as a limitation. Other time frames are also included in this disclosure.

By way of example and not as a limitation, the training component 154 may identify, determine, and/or generate usage-pattern data indicating that, for a smart door lock accessory device 106 associated with a given user account, the target accessory device 106 is transitioned from a "locked" state to an "unlocked" state at or around 6:30 am on weekdays 90% of the time, then the device is transitioned from the "unlocked" state to the "locked" state at or around 6:32 am on weekdays 93% of the time, then the device is transitioned from the "locked" state to the "unlocked" state at or around 5:30 pm on weekdays 95% of the time, and then the device is transitioned from the "unlocked" state to the "locked" state at or around 9:30 pm on weekdays 75% of the time. This usage pattern may be utilized for the analyses described below. It should be understood that while specific functionality of an accessory device 106, specific state changes, specific state-change times and days, and specific state-change probabilities and/or frequencies are provided, these examples are for illustrative purposes only and are not limitations. Any accessory device functionality, state changes, state-change times and/or days, state-change probabilities and/or frequencies may be identified, determined, and/or generated.

The training component 154 may also identify an initial group of the reference devices 108(*a*)-(*n*) from which to analyze reference usage patterns. In examples, the group of reference devices 108(*a*)-(*n*) may be random, may include all or only a portion of accessory devices 108(*a*)-(*n*) associated with the remote system 110, and/or may be selected using one or more criteria. For example, reference accessory devices 108(*a*)-(*n*) may be identified as reference devices 108(*a*)-(*n*) based at least in part on the geolocation of the devices, the device type such as light, plugin, lock, camera, etc., scheduling data associated with the reference accessory devices 108(*a*)-(*n*), and/or contextual data showing one or more similarities between the target accessory device 106 and the reference devices 108(*a*)-(*n*) and/or user accounts associated with the target accessory device 106 and the reference devices 108(*a*)-(*n*). By way of example and not as a limitation, the training component 154 may identify 1,000,000 reference devices 108(*a*)-(*n*) based at least in part on the factors and/or criteria described above. Using an example provided herein, the target accessory device 106 may be a smart light bulb. In examples, the training component 154 may identify reference devices 108(*a*)-(*n*) that have the same light bulb device type and/or that have similar device types such as a wall plugin and/or a lamp.

Additionally, the training component 154 may identify multiple groups of reference devices 108(*a*)-(*n*) based at least in part on different contextual information and/or factors. For example, a first group may be identified based on device type similarity. A second group may be identified based on geographic location. A third group may be identified based on scheduled data similarity. Additional groups may also be identified based on one or more of the factors described herein.

Additionally, the training component 154 may identify, determine, and/or generate reference usage-pattern data for some or all of the reference devices 108(*a*)-(*n*). For example, similar to the target accessory device 106, the reference devices 108(*a*)-(*n*) may be operated over the period of time and data indicating the transition of states for the reference devices 108(*a*)-(*n*) may be identified, determined, and/or generated and stored. The training component 154 may analyze the reference usage-pattern data for the reference devices 108(*a*)-(*n*) with respect to the usage-pattern data associated with the target device 106 to determine a subset of the group of reference devices 108(*a*)-(*n*) that have a high degree of usage similarity. When determining the usage similarity, the training component 154 may be configured to take time zone differences into consideration and may generate adjusted usage-pattern data based at least in part on time zone differences between the target accessory device 106 and one or more of the reference accessory devices 108(*a*)-(*n*). Using the example provided above, the training component 154 may identify the 1,000 reference devices 108(*a*)-(*n*) with reference usage patterns that are most similar to the usage pattern of the target device 106. Additionally, or alternatively, the training component 154 may identify the reference devices 108(*a*)-(*n*), regardless of number, with reference usage patterns that have a degree of similarity that has at least a threshold degree of similarity with the usage pattern of the target device 106.

In examples where the training component 154 identifies multiple groups of reference devices 108(*a*)-(*n*), the training component 154 may determine reference usage patterns for the devices in the groups. Multiple subsets of some or each of the groups of devices 108(*a*)-(*n*) may be identified based on similarity between the reference usage patterns and the user pattern of the target device 106.

In addition to and/or instead of the methods described above, the training component 154 may be configured to determine similarity between reference usage patterns and the target usage pattern based at least in part on one or more other methods. For example, Determining the degree of similarity between a usage pattern and a reference usage pattern may be performed by determining a difference in time from when a state transition occurs for the target device 106 and when a similar state transition occurs for the reference device 108(*a*)-(*n*). For example, if the target device has a usage pattern including a transition from off to on at 6:00 am, a reference usage pattern including a transition from off to on at 6:01 am may be considered more similar than a reference usage pattern including a transition from off to on at 6:20 am. Additionally, or alternatively, for a usage pattern showing a state transition at a given time and day occurring 95% of the time, a reference usage pattern showing a similar state transition at or around the time and on the day occurring 98% of the time may be considered more similar than a reference usage pattern showing a similar state transition occurring 93% of the time. When determining degrees of similarity, the training component 154 may take into consideration holidays and/or days with atypical device usage, such as days when regional and/or worldwide events occur.

In examples, determining similarity between reference usage patterns and a target usage pattern may include determining 12 similarity, which may also be described as L2-norm for least squares, in state-change sequences over a fixed period of time, such as, for example, three months. This determination may indicate the total amount of time a reference device and the target device were in the same or a similar state, with an 12 error value indicating how much the devices were in different states. Additionally, or alternatively, dynamic time warping distances may be determined between state-transition sequences over a fixed period of time, which may be the same period of time or a different period of time as considered in other similarity determinations described herein. This determination may indicate a similarity score to for sequences that have similar shapes, such as devices being in an on state in the morning and then again in the evening. Dynamic time warping may be utilized to account for shifts in the positions of various states. In these examples, the methods may produce a similarity score with the lowest score being most favorable. For example, a decreased 12 error means the amount of time the devices were in the same state is increased, and/or a decreased distance between device representations means increased similarity in state change sequences.

As to selection of reference devices for a subset of reference devices, a percentage of the reference devices that are most similar in usage to the target device may be selected, and/or a given number of the reference devices that are most similar in usage to the target device may be selected. Alternatively, selection may include selecting all reference devices with similarity scores having a certain range of values.

It should be understood that the number of reference devices in the initial group of reference devices is provided by way of example only and not as a limitation. The number of reference devices may be one or more than one and may number in the millions or more. It should also be understood that while the subset of the reference devices has been provided by way of example, the subset may include fewer reference devices than the initial group and/or the subset may include each and every reference device in the initial group. It should also be understood that reference devices may be added and/or removed from the group of reference devices and/or the subset of the reference devices over time.

The prediction component 156 may be configured to utilize the subset of the reference devices 108(a)-(n) to predict the current state of the target accessory device 106. For example, at a given time, the prediction component 156 may identify and/or determine a state of some or all of the reference devices 108(a)-(n) in the subset of the reference devices 108(a)-(n). In examples, a database, such as a database in the data store(s) 142 and/or the user account 140 may maintain the current state of reference devices 108(a)-(n) and that database may be queried to identify the current state of the reference devices 108(a)-(n) in the subset of reference devices 108(a)-(n). In the example utilized herein, the reference devices 108(a)-(n) may be associated with either an "on" state or an "off" state. Using the database indicating the current state of devices, the prediction component 156 may determine that a first number of the subset of the reference devices 108(a)-(n) is in the "on" state and that a second number of the subset of the reference devices 108(a)-(n) is in the "off" state. By way of example, the prediction component 156 may determine, at 10:00 pm on a Wednesday, that 98 of the 100 reference devices 108(a)-(n) in the subset of reference devices 108(a)-(n) are in the "locked" state, and the prediction component 156 may determine that 2 of the 100 reference devices 108(a)-(n) in the subset of the reference devices 108(a)-(n) are in the "unlocked" state at that time and day. Based at least in part on the number of the reference devices 108(a)-(n) that are in the "locked" state and the number of the reference devices 108(a)-(n) that are in the "unlocked" state, the prediction component 156 may determine a probability value that the target accessory device 106 should be in a given state.

Using the example provided herein, the prediction component 156 may determine that there is a 98% probability that the target device 106 should be in the "locked" state at 10:00 pm on the Wednesday in question. In examples, the prediction component 156 may be configured to weight the current state of the reference devices 108(a)-(n) based at least in part on the similarity scores associated with the reference devices 108(a)-(n). In these examples, reference devices 108(a)-(n) having more favorable similarity scores may be weighted more than reference devices 108(a)-(n) having less favorable similarity scores.

Additionally, in examples where the training component 154 identifies multiple subsets of reference devices 108(a)-(n), the prediction component 156 may identify the current state of devices in each or some of the subsets and determine a probability value that the target device 106 should be in a given state for each or some of the subsets. The individual probabilities associated with respective subsets may then be utilized as features to be input into a model configured to determine the probability value that the target device 106 should be in a given state. For example, the probability value from each subset may be weighted based on, for example, the number of devices in the subset, confidence values associated with the probabilities, past performance of the subsets in predicting device state, etc.

Additionally, in examples, the prediction component 156 may be configured to determine a confidence value associated with the probability value that the target device 106 should be in a given state. The confidence value may be based at least in part on the number of reference devices 108(a)-(n) in the given state and/or contextual information associated with the reference devices 108(a)-(n) such as device type. For example, if the target device 106 is a smart light bulb and the subset of reference device 108(a)-(n) includes smart wall plugins, the confidence value may be lower and/or less favorable than if the subset of reference devices 108(a)-(n) included all smart light bulbs.

In examples, the reference devices 108(a)-(n) may be associated with user accounts other than the user account associated with the target accessory device 106. In other examples, the reference devices 108(a)-(n) may be associated with the same user account as the target accessory device 106. In still other examples, the reference devices 108(a)-(n) may include accessory devices associated with their own user accounts and the target device 106 may be associated with a communal space, such as a thermometer located in a hotel room. In these and other examples, user accounts and reference device groups may be changed and/or selected to facilitate state prediction for a given use case.

The recommendation component 158 may be configured to generate recommendation data to be sent to the voice-enabled device 102 and/or the personal device based at least in part on results from the prediction component 156. For example, if the prediction component 156 determines that the probability the target device 106 should be in a "locked" state is at least a threshold probability, but the current state of the target device 106 is in the "unlocked" state, recommendation data may be sent from the remote system 110 to the voice-enabled device 102 and/or the personal device and/or the target accessory device 106. The recommendation data may indicate the current state of the target device 106 and may provide a recommendation that the state be changed. Additionally, or alternatively, directive data may be sent from the remote system 110 to the voice-enabled device 102, the personal device, and/or the target device 106 to transition the state of the device 106.

The target-inference component 160 may be configured to determine which accessory device of multiple accessory devices to operate based at least in part on receiving audio data representing a user utterance from a user of the voice-enabled device 102. For example, a user may speak a user utterance to operate an accessory device and corresponding audio may be captured by the microphones 120 of the voice-enabled device 102.

Corresponding audio data may be generated and sent from the voice-enabled device 102 to the remote system 110. In examples, the speech-processing system 144 may attempt to determine which accessory device to operate in light of the user utterance. For example, the user utterance may include "turn on study light." The ASR component 148 may generate text data corresponding to the audio data and the NLU component 150 may generate intent data indicating that the user utterance is associated with a "turn on" intent and that the device to be acted on has a naming indicator of "study light." In these examples, the smart-home system 146 may be designated as a component that may handle and/or otherwise perform operations corresponding to a "turn on" intent. The speech-processing system 144 may communicate the intent data and/or other data to the smart-home system 146 using the smart-home speechlet 164. The smart-home speechlet 164 may attempt to identify the accessory device to be operated using the data received from the speech-processing system 144 and/or from one or more other components, such as an internet-of-things component.

The user, the remote system 110, and/or a third-party system may have given naming indicators to accessory devices associated with the voice-enabled device 102. However, in this example, none of the naming indicators may be "study light" and/or multiple naming indicators may correspond to "study light." As such, the target-inference component 160 of the smart-home system 146 may perform target inference operations to identify which of the multiple accessory devices is most likely to be the "study light." The target inference operations may include determining which accessory device is most likely in the "on" state at the time the audio data was received by the remote system 110. For example, the target-inference component 160 may determine that 1% of reference devices 108(a)-(n) associated with a first accessory device with the naming indicator of "kitchen light" are in the "unlocked" state. The target-inference component 160 may further determine that 50% of reference devices 108(a)-(n) associated with a second accessory device with the naming indicator of "bedroom light" are in the "unlocked" state. The target-inference component 160 may further determine that 97% of reference devices 108(a)-(n) associated with a third accessory device 106 with the naming indicator of "office light" are in the "on" state. Based at least in part on this analysis, the target-inference component 160 may determine that the third accessory device 106 is most likely the accessory device the user desires to operate.

Additionally, or alternatively, the state prediction operations described herein may be utilized when configuring an accessory device 106 for scheduled state changes. For example, a user may desire to set a schedule for an accessory device 106 to be activated and deactivated during, for example, a given day. While a user may manually set such a schedule, the user may additionally, or alternatively, desire to automatically set a schedule based on typical usage patterns for devices like the accessory device 106. To do so, the configuration component 162 may determine when state changes generally occur for the subset of the reference devices 108(a)-(n). Scheduling data indicating the schedule of such state changes may be generated and a recommendation indicating the schedule may be sent to the voice-enabled device 102 and/or the personal device associated with the user to configure the accessory device 106 for scheduled state changes utilizing the schedule. Based at least in part on receiving input data representing an acceptance of the recommendation, the configuration component 162 may configure the accessory device 106 using the schedule.

Additionally, or alternatively, the state prediction operations described herein may be utilized to determine which accessory devices to transition states at a given time and/or in response to a user request. For example, a user may speak a "good night" or "good morning" user utterance to the voice-enabled device 102. In other examples, the user may provide input to a personal device that corresponds to a "good night" or "good morning" request. In these examples, the user utterance may be associated with an intent to operate one or more accessory devices that a user would typically operate when they are going to bed and/or getting up for the morning. For example, when going to bed, the user may desire to lock the doors, turn off certain lights, turn on other lights, adjust thermostat temperatures, etc. The state prediction operations described herein may be utilized to determine which accessory devices to operate when a user command such as those described with respect to these examples is received.

Additionally, or alternatively, the state prediction operations described herein may be utilized to determine which devices to operate and/or not operate when a user is not present in a space with the accessory devices and/or the voice-enabled device 102. For example, the remote system 110 and/or the voice-enabled device 102 may determine that a user is not present in the space. This determination may be made, for example, by determining that audio has not been received at the microphones 118 of the voice-enabled device 102 and/or audio is received below a threshold amount and/or a threshold intensity. Additionally, or alternatively, the determination may be made based at least in part on image data representing one or more images of the space not depicting a user. Additionally, or alternatively, the determination may be made based at least in part on a signal not being received from a personal device associated with the user. In examples where it is determined that a user is not present in the space, devices may be activated based at least in part on their predicted state. Additionally, or alternatively, devices may restricted from activation during this time period, which may prevent such devices from being activated when not desired.

The speechlet(s) described herein may include a speech-enabled web component that may run in the remote system 110. Speechlet(s) may receive and respond to speech-initiated requests. Speechlet(s) may define life-cycle events for a skill as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

As used herein, a processor, such as processor(s) 114, 126, and/or the processor(s) described with respect to the components of the remote system 110, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114, 126, and/or the processor(s) described with respect to the components of the remote system 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114, 126, and/or 134 may possess its own local memory, which also may store program components, program data, and/or one or more operating systems.

The memory 118, 130, and/or the memory described with respect to the components of the remote system 110 may include volatile and nonvolatile memory, removable and non-removable media implemented in any method or technology for storage of information, such as computer-readable instructions, data structures, program component, or other data. Such memory 118, 130, and/or the memory described with respect to the components of the remote system 110 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118, 130, and/or the memory described with respect to the components of the remote system 110 may be implemented as computer-readable storage media ("CRSM"), which may be any available physical media accessible by the processor(s) 114, 126, and/or the processor(s) described with respect to the components of the remote system 110 to execute instructions stored on the memory 118, 130, and/or the memory described with respect to the components of the remote system 110. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118, 130, and/or the memory described with respect to the components of the remote system 110, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD™ operating system as promulgated by the FreeBSD™ Project; other UNIX or UNIX-like variants; a variation of the Linux™ operating system as promulgated by Linus Torvalds; the FireOS™ operating system from Amazon.com Inc.™ of Seattle, Washington, USA; the Windows™ operating system from Microsoft Corporation™ of Redmond, Washington, USA; LynxOS™ as promulgated by Lynx Software Technologies, Inc.™ of San Jose, California; Operating System Embedded (Enea OSE) as promulgated by ENEA AB of Sweden; and so forth.

The network interface(s) 116, 128, and/or the network interface(s) described with respect to the components of the remote system 110 may enable messages between the components and/or devices shown in system 100 and/or with one or more other remote systems, as well as other networked devices. Such network interface(s) 116, 128, and/or the network interface(s) described with respect to the components of the remote system 110 may include one or more network interface controllers (NICs) or other types of transceiver devices to send and receive messages over the network 110.

For instance, each of the network interface(s) 116, 128, and/or the network interface(s) described with respect to the components of the remote system 110 may include a personal area network (PAN) component to enable messages over one or more short-range wireless message channels. For instance, the PAN component may enable messages compliant with at least one of the following standards IEEE 802.15.4 (ZigBee™), IEEE 802.15.1 (Bluetooth™), IEEE 802.11 (WiFi), or any other PAN message protocol. Furthermore, each of the network interface(s) 116, 128, and/or the network interface(s) described with respect to the components of the remote system 110 may include a wide area network (WAN) component to enable message over a wide area network.

In some instances, the remote system 110 may be local to a space associated the voice-enabled device 102 and/or the hub device 104. For instance, the remote system 110 may be located within first voice-enabled device 102 and/or the hub device 104. In some instances, some or all of the functionality of the remote system 110 may be performed by the voice-enabled device 102 and/or the hub device 104. Also, while various components of the remote system 110 have been labeled and named in this disclosure and each component has been described as being configured to cause the processor(s) 134 to perform certain operations, it should be understood that the described operations may be performed by some or all of the components and/or other components not specifically illustrated.

Figure 2:
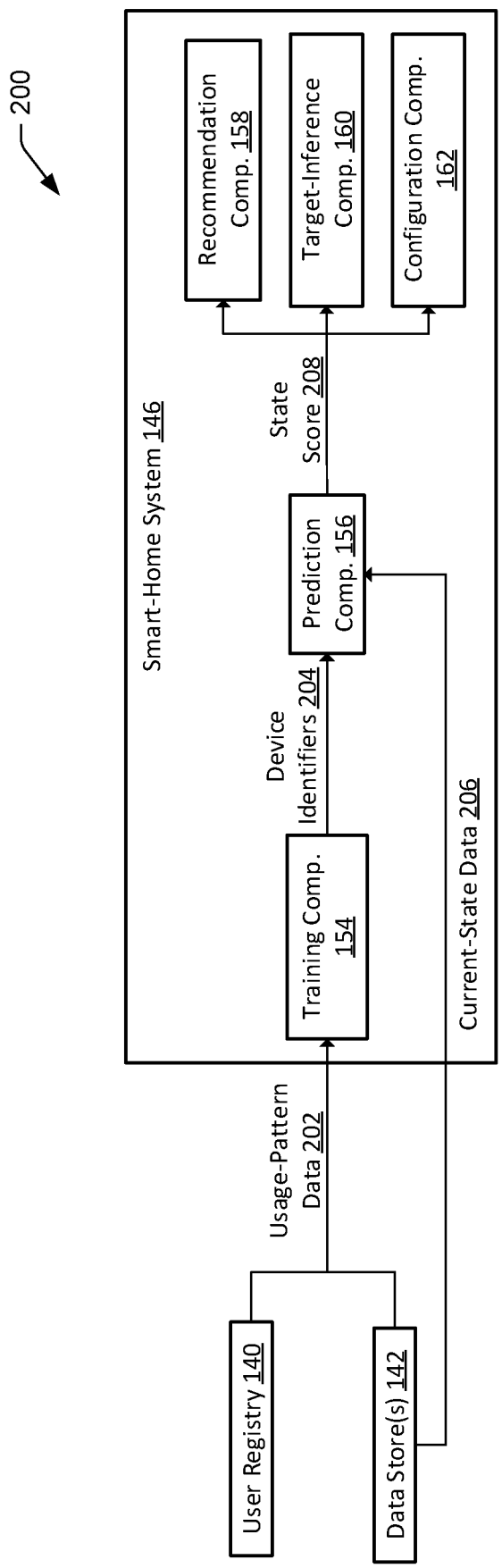
FIG. 2 illustrates a conceptual diagram of components of a system for state prediction of devices.

FIG. 2 illustrates a conceptual diagram of components of a system 200 for state prediction of devices. The system 200 may include one or more components similar to the components described with respect to FIG. 1, such as a user registry 140, one or more data stores 142, and/or a smart-home system 146. The smart-home system 146 may include components such as a training component 154, a prediction component 156, a recommendation component 158, a target-inference component 160, and/or a configuration component 162. FIG. 2 also shows the flow of data from components associated with the system 200.

For example, usage-pattern data 202 may be identified, determined, generated, and/or stored with respect to the user registry 140 and/o the data store(s) 142. The usage-pattern data 202 may indicate a usage pattern of a target accessory device during a period of time, such as, for example, a three-month period of time. For example, the target accessory device may undergo state changes during the period of time, such as being turned on and off. Data indicating the occurrence of these state changes, the character of the state changes, such as transitioning from on to off or from off to on, and/or the time of day and/or day of the week of the state changes may be generated and stored, such as in the data store(s) 142. This usage-pattern data 202 may be utilized to determine the usage pattern of the target accessory device over the period of time. This usage pattern may be utilized for the analyses described below.

The training component 154 of the smart-home system 146 may identify an initial group of reference devices from which to analyze reference usage patterns. In examples, the group of reference devices may be random, may include all or only a portion of accessory devices associated with the remote system, and/or may be selected using one or more criteria. For example, reference accessory devices may be identified as reference devices based at least in part on the geolocation of the devices, the device type such as light, plugin, lock, camera, etc., scheduling data associated with the reference accessory devices, and/or contextual data showing one or more similarities between the target accessory device and the reference devices and/or user accounts associated with the target accessory device and the reference devices.

Additionally, the training component 154 may identify multiple groups of reference devices based at least in part on different contextual information and/or factors. For example, a first group may be identified based on device type similarity. A second group may be identified based on geographic location. A third group may be identified based on scheduled data similarity. Additional groups may also be identified based on one or more of the factors described herein.

Additionally, the training component may utilize reference usage-pattern data 202 for some or all of the reference devices. For example, similar to the target accessory device, the reference devices may be operated over the period of time and data indicating the transition of states for the reference devices may be generated and stored. The training component 154 may analyze the reference usage-pattern data 202 for the reference devices with respect to the usage-pattern data 202 associated with the target device to determine a subset of the group of reference devices that have a high degree of usage similarity. Additionally, or alternatively, the training component 154 may identify the reference devices, regardless of number, with reference usage patterns that have a degree of similarity that is at least a threshold degree of similarity with the usage pattern of the target device. It should be understood that the number of reference devices in the initial group of reference devices is provided by way of example only and not as a limitation. The number of reference devices may be one or more than one and may number in the millions or more. It should also be understood that while the subset of the reference devices has been provided by way of example, the subset may include fewer reference devices than the initial group and/or the subset may include each and every reference device in the initial group. It should also be understood that reference devices may be added and/or removed from the group of reference devices and/or the subset of the reference devices over time.

In examples where the training component 154 identifies multiple groups of reference devices, the training component 154 may determine reference usage patterns for the devices in the groups. Multiple subsets of some or each of the groups of devices may be identified based on similarity between the reference usage patterns and the user pattern of the target device.

The training component 154 may provide, to the prediction component 156, device identifiers 204 corresponding to the reference devices in the subset of reference devices. The prediction component 156 may be configured to utilize the subset of the reference devices to predict the current state of the target accessory device. For example, at a given time, the prediction component 156 may receive current-state data 206 indicating a state of some or all of the reference devices in the subset of the reference devices. In examples, a database, such as a database in the data store(s) 142 and/or the user account 140 may maintain the current-state data 206 of reference devices and that database may be queried to identify the current state of the reference devices in the subset of reference devices using the device identifiers 204 provided by the training component 154. In the example utilized herein, the reference devices may be associated with either an "on" state or an "off" state. Using the database indicating the current state of devices, the prediction component 156 may determine that a first number of the subset of the reference devices is in the "on" state and that a second number of the subset of the reference devices is in the "off" state. Based at least in part on the number of the reference devices that are in the "on" state and the number of the reference devices that are in the "off" state, the prediction component 156 may generate a state score 208 associated with the target device. The state score 208 may include a probability value that the target accessory device should be in a given state. It should be understood that while the state score 208 is described herein as a probability value and/or a percent, the state score 208 may represent any value or metric that indicates how likely it is that the target accessory device should be in a given state at a given time.

Additionally, in examples where the training component 154 identifies multiple subsets of reference devices, the prediction component 156 may identify the current state of devices in each or some of the subsets and determine a probability value that the target device 106 should be in a given state for each or some of the subsets. The individual probabilities associated with respective subsets may then be utilized as features to be input into a model configured to determine the probability that the target device 106 should be in a given state. For example, the probability from each subset may be weighted based on, for example, the number of devices in the subset, confidence values associated with the probabilities, past performance of the subsets in predicting device state, etc. In these examples, multiple state scores 208 may be generated and/or the model may be utilized to generate a single state score 208 to be utilized as described below.

It should be noted that the operations performed by the training component 154 and/or the prediction component 156 may be performed periodically, randomly, in response to the occurrence of an event, on a scheduled basis, and/or continuously.

The state score 208 may be provided to one or more other component of the smart-home system 146 to utilize the state prediction performed by the prediction component 156. For example, the recommendation component 158 may be configured to generate recommendation data to be sent to the voice-enabled device and/or a personal device associated with the voice-enabled device based at least in part on the state score 208 from the prediction component 156. For example, if the prediction component 156 determines that the probability the target device should be in a "locked" state is at least a threshold probability, but the current state of the target device is in the "unlocked" state, recommendation data may be sent from the remote system to the voice-enabled device 102 and/or the personal device and/or the target accessory device. By way of example, if the state score 208 indicates that the target device has at least a 90% probability of being in the "off" state and it is currently in the "on" state, the recommendation data may be sent. The recommendation data may indicate the current state of the target device and may provide a recommendation that the state be changed. Additionally, or alternatively, directive data may be sent from the remote system to the voice-enabled device 102, the personal device, and/or the target device to transition the state of the device.

By way of further example, the target-inference component 160 may be configured to determine which accessory device of multiple accessory devices to operate based at least in part on receiving audio data representing a user utterance from a user of the voice-enabled device. For example, a user may speak a user utterance to operate an accessory device and corresponding audio may be captured by the microphones of the voice-enabled device. Corresponding audio data may be generated and sent from the voice-enabled device to the remote system. In examples, a speech-processing system may attempt to determine which accessory device to operate in light of the user utterance. The smart-home system 146 may be designated as a component that may handle and/or otherwise perform operations corresponding to an intent to operate accessory device and the speech-processing system may communicate the intent data and/or other data to the smart-home system 146 using a smart-home speechlet. The smart-home speechlet may attempt to identify the accessory device to be operated using the data received from the speech-processing system and/or from one or more other components, such as an internet-of-things component.

The user, the remote system, and/or a third-party system may have given naming indicators to accessory devices associated with the voice-enabled device. However, in this example, none of the naming indicators may correspond to an identifier of an accessory device provided in the user utterance. As such, the target-inference component 160 of the smart-home system 146 may perform target-inference operations to identify which of the multiple accessory devices is most likely to be the targeted device. The target inference operations may include determining which accessory device is most likely in a given state at the time the audio data was received by the remote system. The state scores 208 may be provided to the target-inference component 160, which may utilize those state scores to determine which accessory device is most likely to be associated with a given state at the time the request was received.

Additionally, or alternatively, the state prediction operations described herein may be utilized when configuring an accessory device for scheduled state changes. For example, a user may desire to set a schedule for an accessory device to be activated and deactivated during, for example, a given day. While a user may manually set such a schedule, the user may additionally, or alternatively, desire to automatically set a schedule based on typical usage patterns for devices like the accessory device. To do so, the configuration component 162 may determine when state changes generally occur for the subset of the reference devices. Scheduling data indicating the schedule of such state changes may be generated and a recommendation indicating the schedule may be sent to the voice-enabled device 102 and/or the personal device associated with the user to configure the accessory device for scheduled state changes utilizing the schedule. Based at least in part on receiving input data representing an acceptance of the recommendation, the configuration component 162 may configure the accessory device 106 using the schedule.

Figure 3:
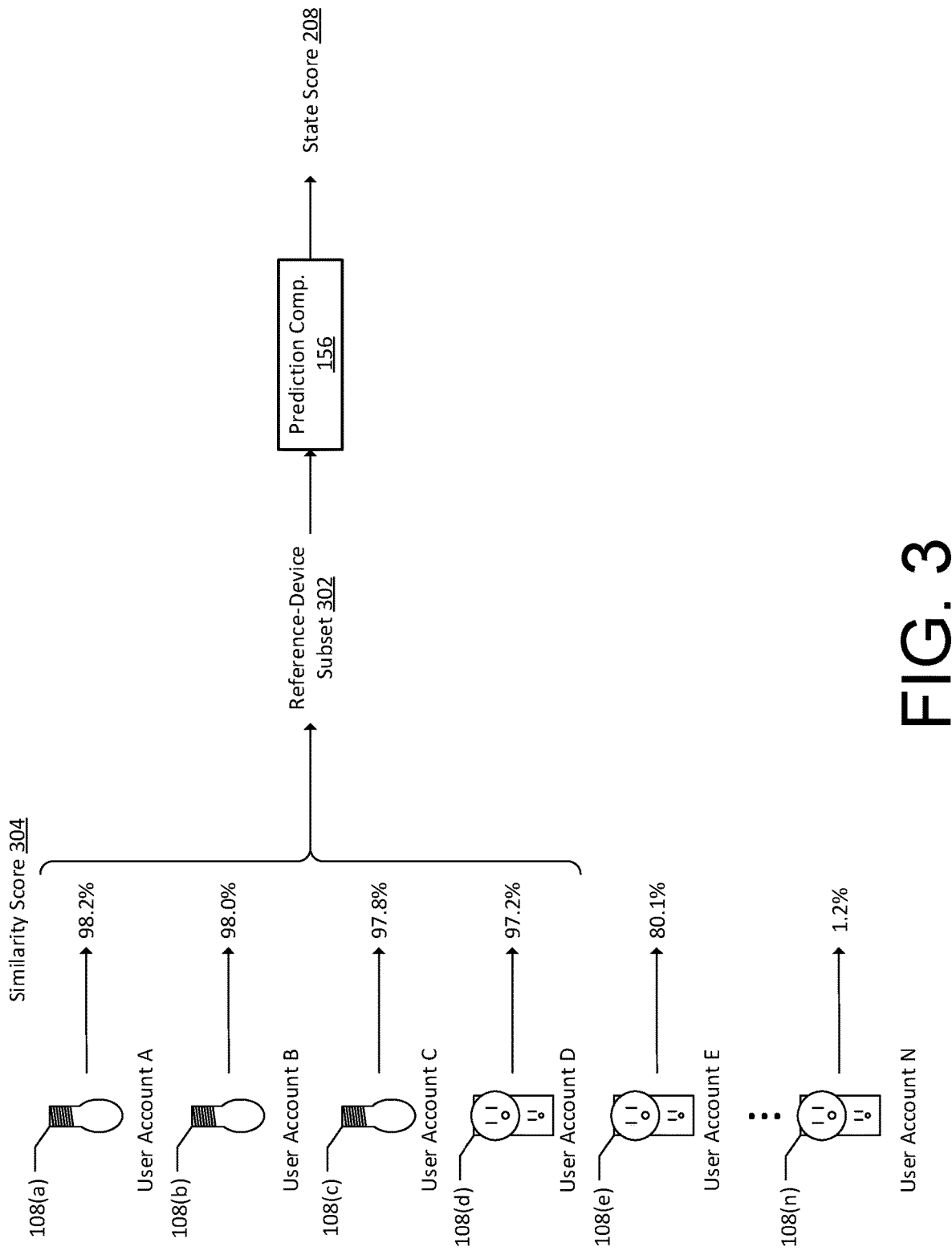
FIG. 3 illustrates a conceptual diagram of devices and data utilized for state prediction of devices.

FIG. 3 illustrates a conceptual diagram of devices and data utilized for state prediction of devices. FIG. 3 is illustrated as a progression from left to right of which devices may be involved in device state prediction and the flow of data. For example, a training component, such as the training component 154 as described herein, may utilize reference usage-pattern data associated with reference accessory devices 108(*a*)-(*n*) to determine which reference accessory devices 108(*a*)-(*n*) are similar to a usage pattern of a target device. For example, a target device may include a smart light bulb and may have a given usage pattern indicating when the target device transitions between states. The usage pattern for the target device may be analyzed with respect to the reference usage patterns for the reference devices to determine which reference devices are most similar in usage pattern to the target device. A similarity score 208 may be determined for some or all of the reference devices, such as by a prediction component as described herein.

As shown by way of example in FIG. 3, a first reference accessory device 108(*a*) may have a similarity score 304 of 98.2%, which may indicate a reference usage pattern that is 98.2% similar to the usage pattern for the target accessory device. A second reference accessory device 108(*b*) may have a reference usage pattern that is 98.0% similar to the usage pattern for the target accessory device. A third reference accessory device 108(*c*) may have a reference usage pattern that is 97.8% similar to the usage pattern for the target accessory device. A fourth reference accessory device 108(*d*) may have a reference usage pattern that is 97.2% similar to the usage pattern for the target accessory device. A fifth reference accessory device 108(*e*) may have a reference usage pattern that is 80.1% similar to the usage pattern for the target accessory device. Lastly, an nth reference accessory device 108(*n*) may have a reference usage pattern that is 1.2% similar to the usage pattern for the target accessory device. In examples, the references accessory devices 108(*a*)-(*n*) may be associated with the same user account. In other examples, as illustrated in FIG. 3, the reference devices 108(*a*)-(*n*) may be associated with different user accounts.

In the example used with respect to FIG. 3, a threshold similarity score may have been established, such as, for example 90% similar. The threshold similarity score may be established based at least in part on, for example, the device type associated with the target accessory device, a number of reference accessory devices that were queried, historical data indicating success and failure rates associated with state prediction using certain thresholds, and/or one or more other factors. Using a 90% threshold similarity score by way of example, the reference accessory devices 108(*a*)-(*d*) may be selected as a reference-device subset 302 based at least in part on similarity scores associated with the reference devices 108(*a*)-(*d*) being at least the threshold similarity score. The reference-device subset 302 may represent device identifiers for the reference devices 108(*a*)-(*d*) that make us the subset 302.

The training component may provide, to the prediction component 156, the device identifiers corresponding to the reference devices in the subset 302 of reference devices. The prediction component 156 may be configured to utilize the subset 302 of the reference devices to predict the current state of the target accessory device. For example, at a given time, the prediction component 156 may receive current-state data indicating a state of some or all of the reference devices in the subset of the reference devices. In examples, a database, such as a database in the data store(s) and/or the user account may maintain the current-state data of reference devices and that database may be queried to identify the current state of the reference devices in the subset 302 of reference devices using the device identifiers provided by the training component. Using the database indicating the current state of devices, the prediction component 156 may determine that a first number of the subset of the reference devices is in the "on" state and that a second number of the subset of the reference devices is in the "off" state. Based at least in part on the number of the reference devices that are in the "on" state and the number of the reference devices that are in the "off" state, the prediction component 156 may generate a state score 208 associated with the target device. The state score 208 may include a probability value that the target accessory device should be in a given state. It should be understood that while the state score 208 is described herein as a probability value and/or a percent, the state score 208 may represent any value or metric that indicates how likely it is that the target accessory device should be in a given state at a given time.

Figure 4:
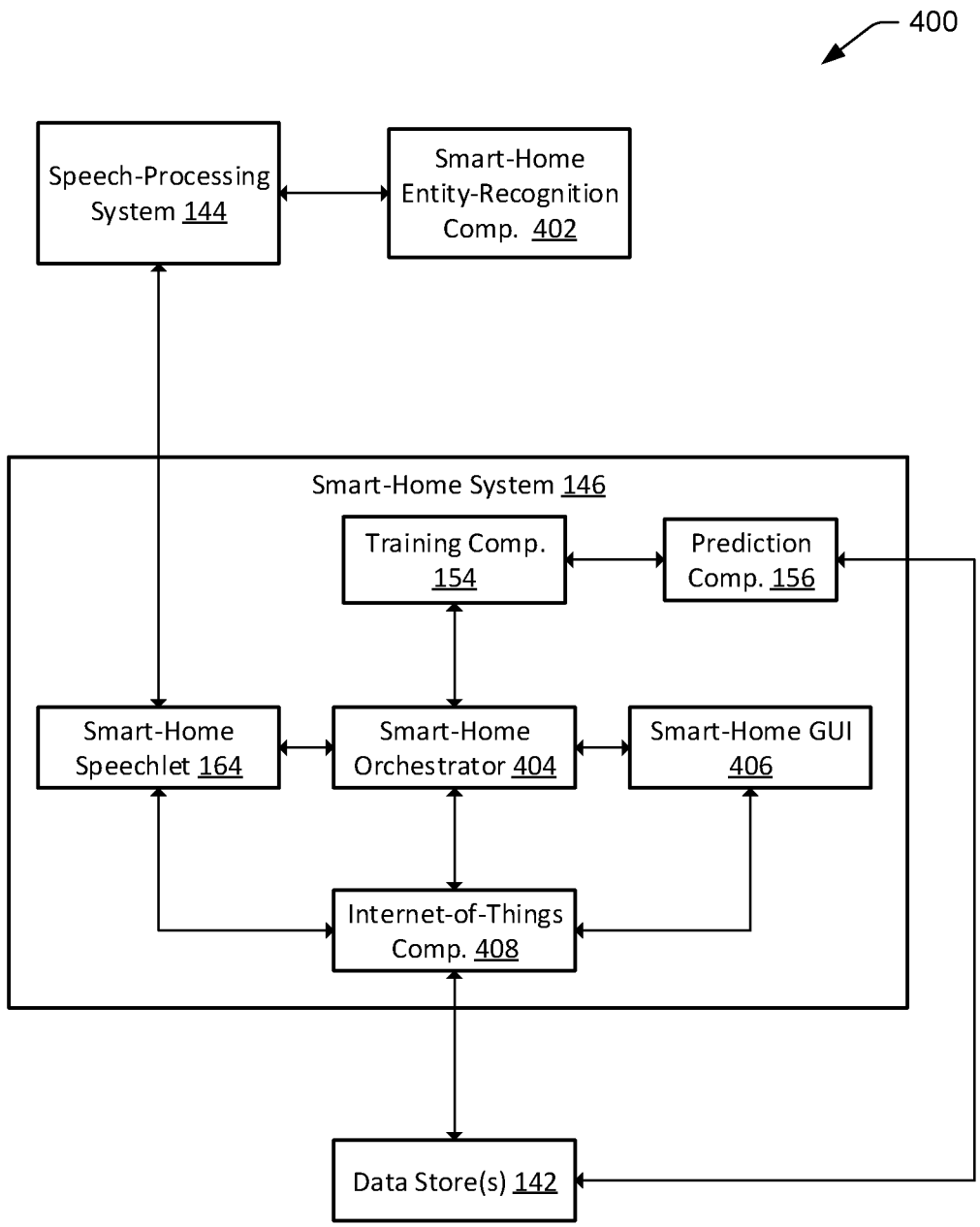
FIG. 4 illustrates a conceptual diagram of a smart-home system utilized for state prediction of devices.

FIG. 4 illustrates a conceptual diagram of a smart-home system 146 utilized for state prediction of devices. The smart-home system 146 may include components described above with respect to FIG. 1, such as a training component 154, a prediction component 156, and a smart-home speechlet 164. The smart-home system 146 may also be configured to send data to and receive data from other components of a remote system and/or one or more other systems. For example, the other components may include a speech-processing system 144, and one or more data stores 142. The smart-home system 146 may also include components such as a smart-home orchestrator 404, a smart-home graphical user interface (GUI) 406, and/or an internet-of-things component 408. Each of these components will be described in detail below.

As described herein, a user may interact with an accessory device using tactile input to the accessory device, voice input to a voice-enabled device, and/or input to an application residing on and/or accessible to a personal device. When a user interacts with an accessory device using voice input to a voice-enabled device, audio data representing user utterances may be received at the speech-processing system 144. The speech-processing system 144 may analyze the audio data and/or corresponding text data generated, by way of example, using an ASR component, to determine that the user utterance represents an intent to control an accessory device. To determine the intent associated with the user utterance, the speech-processing system 144 may utilize a smart-home entity-recognition component 402, which may be utilized to inform one or more intents available to the speech-processing system 144 and/or to inform one or more values associated with the intents. For example, the user utterance of "turn off bedroom lights" may be analyzed by the speech-recognition component 144. The smart-home entity-recognition component 402 may train or otherwise provide data to the speech-processing system 144 indicating intents associated with operation of accessory devices, such as "turn on," "turn off," "activate," "deactivate," "dim," "brighten," "lock," "unlock," etc. The smart-home entity-recognition component 402 may additionally, or alternatively, provide data indicating identifiers and/or payloads associated with such intents, such as "light," "lights," "lock," "outlet," "switch," etc. It should be understood that while the smart-home entity-recognition component 402 is depicted in FIG. 4 as being a component separate from the smart-home system 146, the smart-home entity-recognition component 402 may be a component of the smart-home system 146.

The speech-processing system 144 may be configured to determine that the intent corresponds to an operation configured to be performed by the smart-home system 146, and based at least in part on such a determination, the speech-processing system 144 may provide the intent data and/or other data associated with the request to the smart-home speechlet 164 of the smart-home system 146. The smart-home orchestrator 404 may be configured to receive data indicating that the smart-home speechlet 164 has been invoked to determine a directive to be performed with respect to an accessory device and may query one or more other components of the smart-home system 146 to effectuate the request. For example, the smart-home orchestrator 404 may query the internet-of-things component 408 to identify naming indicators associated with accessory devices for a particular user account. The internet-of-things component 408 may query the data store(s) 142 and/or the user account for such naming indicators. The internet-of-things component 408 may return the naming indicators to the smart-home speechlet 164, which may identify which naming indicator corresponds to the identified target device from the user utterance.

In other examples, such as when the smart-home speechlet 164 and/or the internet-of-things component 408 cannot determine which accessory device corresponds to the identifier target device, the smart-home orchestrator 404 may query the training component 154 and/or the prediction component 156 to predict the state of accessory devices as described herein. For example, the training component 154 may identify a subset of reference devices that have a similar usage pattern to one or more of the candidate accessory devices and may provide device identifiers for the subset of the reference devices to the prediction component 156. The prediction component 156 may determine the current state of the subset of the reference devices by querying a database of current-state data, which may be stored with respect to the data store(s) 142. This information may be utilized to predict the state of multiple candidate accessory devices to determine which accessory device is most likely to correspond to the identified target device from the user utterance.

Additionally, or alternatively, as mentioned above, the accessory devices may be operated based at least in part on input data received from an application residing on and/or accessible to a personal device, such as a mobile phone and/or computer. The smart-home GUI 406 may be utilized to receive the input data and/or to display recommendations to a user. For example, the smart-home GUI 406 may be utilized to display recommendations for the changing of device states such as when the system determines that a target accessory device is operating in a state that differs from the state predicted for the device at a given time. By way of continued example, the smart-home GUI 406 may be utilized to display recommendations for scheduling state transitions for an accessory device, such as when the device is in a given mode, such as an "away mode."

Figure 5:
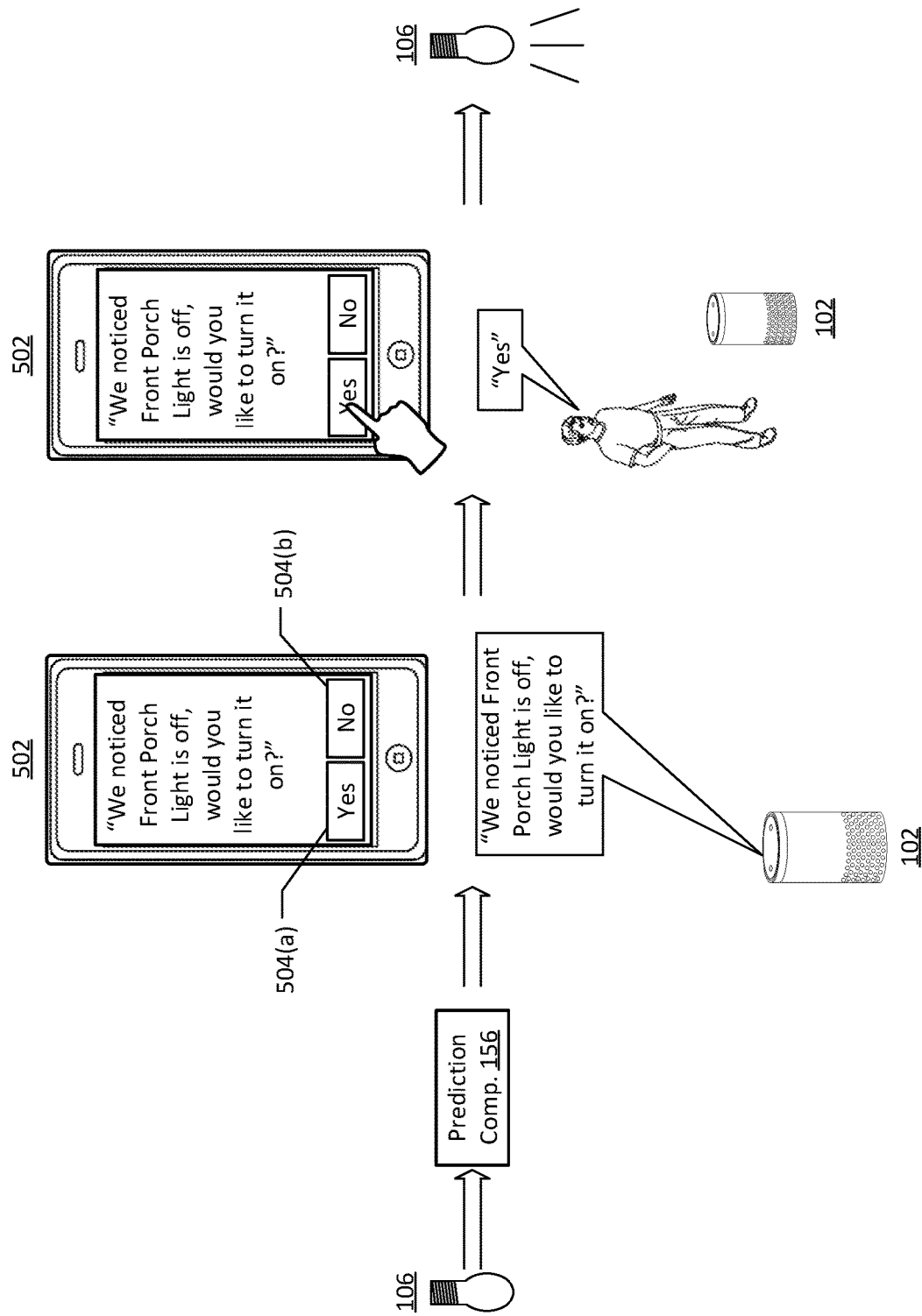
FIG. 5 illustrates a conceptual diagram of devices utilized for state prediction and state transition of a target device.

FIG. 5 illustrates a conceptual diagram of devices utilized for state prediction and state transition of a target device. FIG. 5 is illustrated as a progression from left to right of devices involved in state prediction of devices and the flow of data. For example, an accessory device 106 may be in a given state, such as an "off" state as shown in FIG. 5. A prediction component 156, as described more fully herein, may be utilized to predict the state of the device at a given time. For example, the current state for a group of reference devices determined to have a similar usage pattern to the accessory device 106 may be determined and the number of such reference devices in an "on" state versus a number of the reference devices in an "off" state may be identified. This information may be utilized by the prediction component 156 to determine a probability value that the accessory device 106 should be in an "on" state. In this example, the prediction component 156 may determine that the probability that the accessory device 106 should be in the "on" state is at least a threshold probability, indicating a high likelihood that the accessory device 106 should be in the "on" state.

Based at least in part on determining that the accessory device 106, which is in the "off" state, should be in the "on" state, recommendation data representing a recommendation to transition the accessory device 106 from the "off" state to the "on" state may be generated and may be sent to one or more devices for presentation and/or display. For example, the recommendation data, as well as directive data in examples, may be sent to a voice-enabled device 102 for output via one or more speakers of the voice-enabled device 102. For example, the recommendation may include "we noticed Front Porch Light is off, would you like to turn it on?" Additionally, or alternatively, the recommendation may be displayed on a display of a personal device 502 along with one or more selectable portions 504(a)-(b) of the display for the user to indicate acceptance and/or denial of the recommendation.

A user may then provide an indication of whether the recommendation should be accepted or rejected. For example, the user may speak a user utterance of "yes," which may be captured by microphones of the voice-enabled device 102. Corresponding audio data may be generated and may be sent to a remote system for speech processing. Additionally, or alternatively, the user may select a portion of a screen of the personal device 502, for example, corresponding to a "yes" selectable portion 504(a). Corresponding input data may be generated and may be sent to the remote system for processing. It should be understood that user interaction with the voice-enabled device 102 and/or the personal device 502 is provided by way of example and other forms of input may also be possible. Based at least in part on receiving the user input, herein indicating an intent to accept the recommendation, the remote system may generate and send directed data to the voice-enabled device 102, the personal device 502, and/or a hub device (not shown). The directive data may instruct the voice-enabled device 102, the personal device 502, and/or the hub device to perform an action with respect to the accessory device 106, here turning the accessory device 106 on.

Additionally, or alternatively, the remote system may send directive data to display text and/or output audio requesting whether the operation of the target device 106 should be performed at some time in the future. For example, the request may be "Do you want me to continue to turn on this device at this time of day?" The user may provide a response, such as a response confirming that the device should be scheduled to transition states as indicated by the request.

Figure 6:
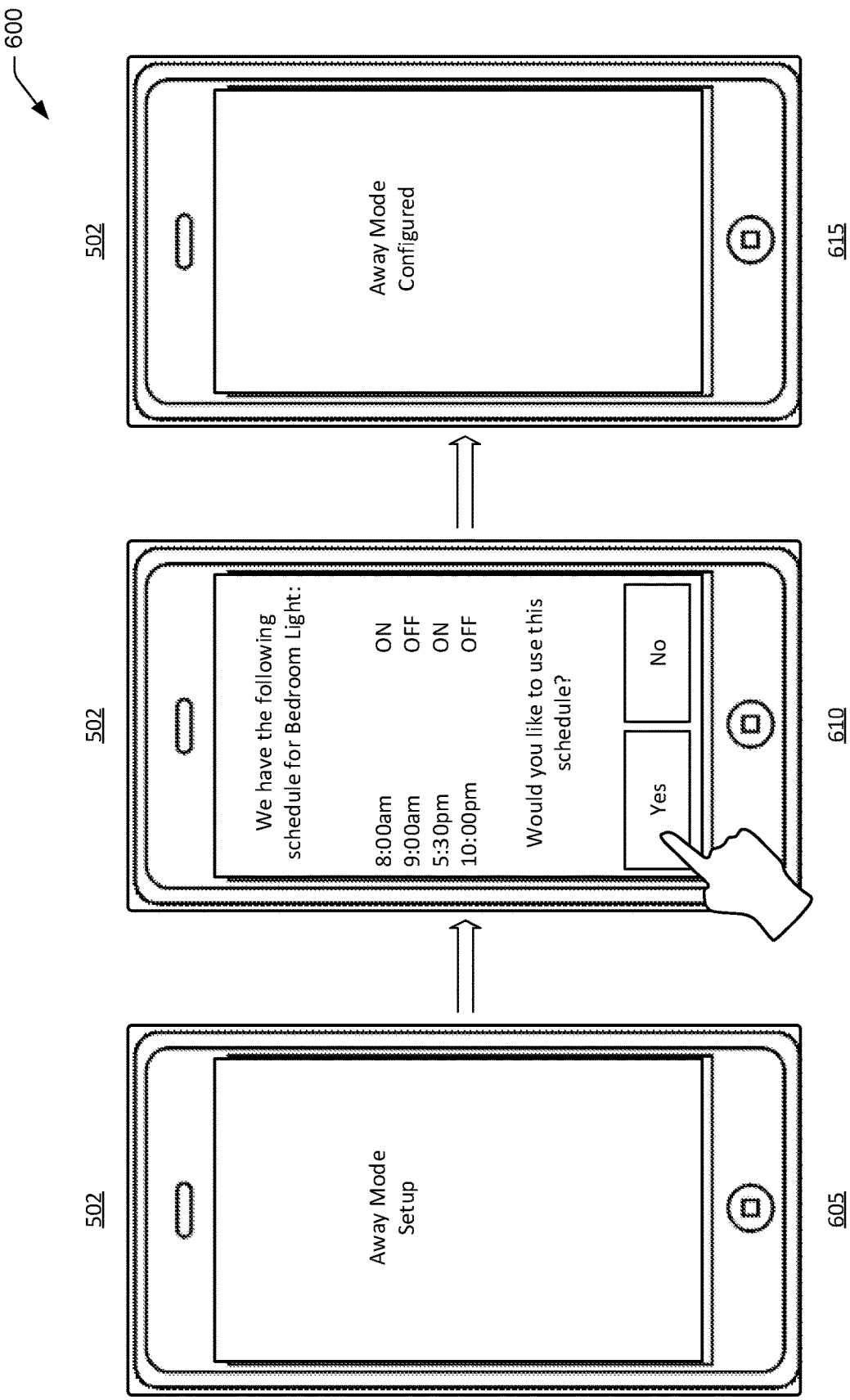
FIG. 6 illustrates a progression of an example user interface utilized for configuration of at least one mode associated with a device.

FIG. 6 illustrates a progression of an example user interface 600 utilized for configuration of at least one mode associated with a device 502. FIG. 6 is illustrated as a progression from left to right of the example user interface 600, such as displayed on a personal device 502.

At step 605, the user interface 600 may display one or more setup options to set up one or more modes of operation of accessory devices associated with the personal device 502. For example, an application associated with a voice-enabled device, a hub device, and/or one or more accessory devices may reside on the personal device 502 and/or may be accessible to the personal device 502. The application may be utilized to display information and/or to receive input, such as touch input from a user, and generate corresponding input data. The application may further be used to configure the accessory devices, including pairing accessory devices to hub devices and/or to voice-enabled devices and/or controlling functionality of accessory devices. In examples, the accessory devices may be configured to operate in one or more modes. For example, an "away mode" may be available and may be utilized to operate accessory devices when a user is away from the accessory devices, such as when the user is at work, on vacation, etc. The user may provide input to the personal device 502 indicating that the user desires to configure the away mode.

Based at least in part on receiving input data indicating that the away mode is being configured, the personal device 502, a voice-enabled device, and/or a remote system associated with the voice-enabled device may perform state prediction analyses as described herein. For example, the accessory device to be configured for operation in the away mode may be a "bedroom light." A device type associated with the accessory device may be determined and a group of reference devices associated with the same or a similar device type may be identified. A training component, as described more fully herein, may be utilized to identify a subset of the group of reference devices that have reference usage patterns that are similar, such as above a threshold degree of similarity, to a usage pattern of the "bedroom light" accessory device. The reference usage patterns of the subset of reference devices may be analyzed to determine a schedule of state transitions for all or some of the reference devices and corresponding scheduling data may be generated.

At step 610, the personal device 502 may be caused to display information associated with the schedule data. For example, information indicating that a schedule has been identified for setup of the away mode may be displayed and/or an indication of the details of the identified schedule may be displayed. As shown in FIG. 6, the indication of the details of the schedule may include timing indicators and corresponding state-transition indicators that, together, indicate when state transitions would be scheduled to occur. A request to confirm use of the schedule may also be displayed along with selectable portions of the display of the personal device 502 for selecting whether the user would like to accept or reject the request.

Additionally, or alternatively, device state duration may be utilized to configure and/or schedule device state transitions. For example, the duration of time during which a reference device is in a given state may be identified and offered as an option for determining when the state of a target device should be transitioned and how long the state should be maintained. In addition to, or instead of, determining scheduling data as described herein, the system may configure the away mode by periodically and/or continuously and/or randomly identifying the states of reference devices and causing a state transition on the target device when the probability that the target device should be in a given state is favorable enough, such as above a threshold probability value.

Based at least in part on receiving user input indicating acceptance of the request, at step 615, the user interface 600 may be caused to display an indication that the away mode has been configured. As shown by way of example in FIG. 6, the indication may include text such as "Away Mode Configured." It should be understood that while a user interface 600 is utilized by way of example to illustrate configuration of modes using state prediction of devices, other methods may be utilized, such as utilizing voice commands and output of audio by the personal device 502 and/or a voice-enabled device.

Figure 7:
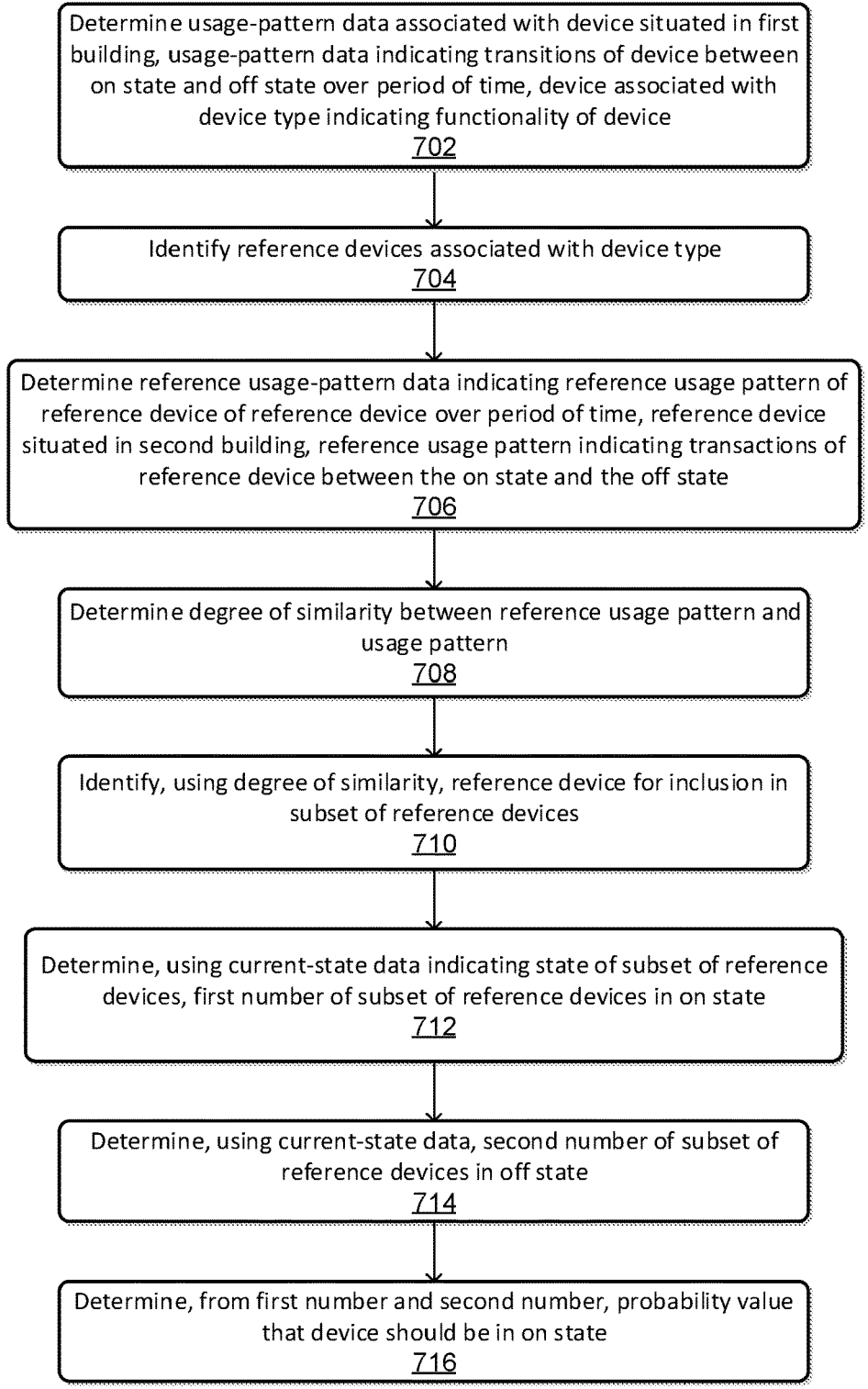
FIG. 7 illustrates a flow diagram of an example process for state prediction of devices.
Figure 8:
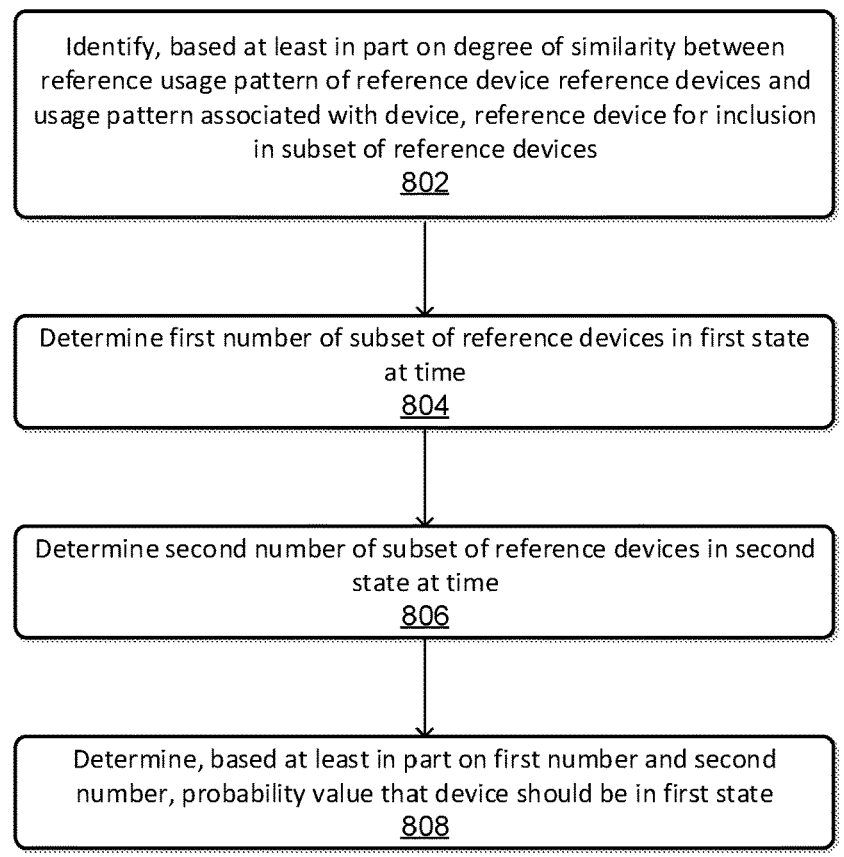
FIG. 8 illustrates a flow diagram of another example process for state prediction of devices.

FIGS. 7 and 8 illustrate processes for state prediction of devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, 9, and 10, although the processes may be implemented in a wide variety of other environments, architectures and systems.

FIG. 7 illustrates a flow diagram of an example process 700 for state prediction of devices. The order in which the operations or steps are described is not intended to be construed as a limitation, and any number of the described operations may be combined in any order and/or in parallel to implement process 700.

At block 702, the process 700 may include determining usage-pattern data associated with a device situated in a first building, the usage-pattern data indicating transitions of the device between an on state and an off state over a period of time, the device associated with a device type indicating functionality of the device. For example, the device may undergo state changes during the period of time, such as being turned on and off. Data indicating the occurrence of these state changes, the character of the state changes, such as transitioning from on to off or from off to on, and/or the time of day and/or day of the week of the state changes may be identified, determined, and/or generated and stored, such as in data store(s). A training component may utilize this usage-pattern data to determine the usage pattern of the device over the period of time. It should be understood that while the period of time has been described as three months, that time frame is provided by way of illustration only and not as a limitation. Other time frames are also included in this disclosure.

By way of example and not as a limitation, the training component may identify, determine, and/or generate usage-pattern data indicating that, for a smart door lock accessory device associated with a given user account, the device is transitioned from a "locked" state to an "unlocked" state at or around 6:30 am on weekdays 90% of the time, then the device is transitioned from the "unlocked" state to the "locked" state at or around 6:32 am on weekdays 93% of the time, then the device is transitioned from the "locked" state to the "unlocked" state at or around 5:30 pm on weekdays 95% of the time, and then the device is transitioned from the "unlocked" state to the "locked" state at or around 9:30 pm on weekdays 75% of the time. This usage pattern may be utilized for the analyses described herein.

At block 704, the process 700 may include identifying reference devices associated with the device type. For example, the training component may identify an initial group of reference devices from which to analyze reference usage patterns. In examples, the group of reference devices may be random, may include all or only a portion of accessory devices associated with the remote system, and/or may be selected using one or more criteria. For example, reference accessory devices may be identified as reference devices based at least in part on the geolocation of the devices, the device type such as light, plugin, lock, camera, etc., scheduling data associated with the reference accessory devices, and/or contextual data showing one or more similarities between the device and the reference devices and/or user accounts associated with the device and the reference devices. By way of example and not as a limitation, the training component may identify 1,000,000 reference devices based at least in part on the factors and/or criteria described above. Using an example provided herein, the device may be a smart light bulb. In examples, the training component may identify reference devices that have the same light bulb device type and/or that have similar device types such as a wall plugin and/or a lamp.

At block 706, the process 700 may include determining reference usage-pattern data indicating a reference usage pattern of a reference device of the reference devices over the period of time. The reference device may be situated in a second building that differs from the first building. For example, the training component may identify, determine, and/or generate reference usage-pattern data for some or all of the reference devices. For example, similar to the device, the reference devices may be operated over the period of time and data indicating the transition of states for the reference devices may be identified, determined, and/or generated and stored.

At block 708, the process 700 may include determining a degree of similarity between the reference usage pattern and the usage pattern. When determining the usage similarity, the training component may be configured to take time zone differences into consideration and may generate adjusted usage-pattern data based at least in part on time zone differences between the device and one or more of the reference accessory devices. Using the example provided herein, the training component may identify the 1,000 reference devices with reference usage patterns that are most similar to the usage pattern of the device. Additionally, or alternatively, the training component may identify the reference devices, regardless of number, with reference usage patterns that have a degree of similarity that has at least a threshold degree of similarity with the usage pattern of the device.

At block 710, the process 700 may include identifying, using the degree of similarity, the reference device for inclusion in a subset of the reference devices. Determining the degree of similarity between a usage pattern and a reference usage pattern may be performed by determining a difference in time from when a state transition occurs for the device and when a similar state transition occurs for the reference device. For example, if the target device has a usage pattern including a transition from off to on at 6:00 am, a reference usage pattern including a transition from off to on at 6:01 am may be considered more similar than a reference usage pattern including a transition from off to on at 6:20 am. Additionally, or alternatively, for a usage pattern showing a state transition at a given time and day occurring 95% of the time, a reference usage pattern showing a similar state transition at or around the time and on the day occurring 98% of the time may be considered more similar than a reference usage pattern showing a similar state transition occurring 93% of the time. When determining degrees of similarity, the training component may take into consideration holidays and/or days with atypical device usage, such as days when regional and/or worldwide events occur.

At block 712, the process 700 may include determining, using current-state data indicating a state of the subset of the reference devices, a first number of the subset of the reference devices in the on state. For example, at a given time, a prediction component may identify and/or determine a state of some or all of the reference devices in the subset of the reference devices. In examples, a database, such as a database in the data store(s) and/or a user account may maintain the current state of reference devices and that database may be queried to identify the current state of the reference devices in the subset of reference devices. In the example utilized herein, the reference devices may be associated with either an "on" state or an "off" state. Using the database indicating the current state of devices, the prediction component may determine that a first number of the subset of the reference devices is in the "on" state.

At block 714, the process 700 may include determining, using the current-state data, a second number of the subset of the reference devices in the off state. Determining the second number of the subset of the reference devices in a second state may be performed in the same or a similar manner as determining the first number.

At block 716, the process 700 may include determining, from the first number and the second number, a probability value that the device should be in the on state. For example, based at least in part on the number of the reference devices that are in the "locked" state and the number of the reference devices that are in the "unlocked" state, the prediction component may determine a probability value that the device should be in a given state. Using the example provided herein, the prediction component may determine that there is a 98% probability that the device should be in the "locked" state at 10:00 pm on the Wednesday in question. In examples, the prediction component may be configured to weight the current state of the reference devices based at least in part on the similarity scores associated with the reference devices. In these examples, reference devices having more favorable similarity scores may be weighted more than reference devices having less favorable similarity scores.

The process 700 may additionally, or alternatively, include receiving an indication that the device is in the off state and determining that the probability value is at least a threshold probability value. The process 700 may also include generating, based at least in part on the probability value being at least the threshold probability value, notification data associated with a notification that the device is in the off state instead of the on state and sending the notification data to a mobile device associated with the device. The process 700 may also include receiving, from the mobile device, input data indicating a request to transition the device from the off state to the on state and sending an instruction configured to cause the device to transition from the off state to the on state based at least in part on the request.

The process 700 may additionally, or alternatively, include receiving, from a voice-enabled device and during a time period, audio data representing a user utterance and determining, based at least in part on the audio data, intent data indicating an intent to operate a target device. The process 700 may also include determining, based at least in part on the probability value, that the device is operated during the time period and identifying the device as the target device based at least in part on determining that the device is operated during the time period.

The process 700 may additionally, or alternatively, include receiving an indication that an away mode is being configured for use and determining, based at least in part on the reference usage-pattern data associated, scheduling data representing a schedule for transitioning the device between the on state and the off state over time period. The process 700 may also include generating recommendation data indicating a recommendation to configure the away mode using the scheduling data and sending the recommendation data to a mobile device associated with the device. The process 700 may also include receiving, from the mobile device, input data representing an acceptance of the recommendation and causing the away mode to be configured using the schedule based at least in part on the input data.

FIG. 8 illustrates a flow diagram of another example process 800 for state prediction of devices. The order in which the operations or steps are described is not intended to be construed as a limitation, and any number of the described operations may be combined in any order and/or in parallel to implement process 800.

At block 802, the process 800 may include identifying, based at least in part on a degree of similarity between a reference usage pattern of a reference device of reference devices and a usage pattern associated with a device, the reference device for inclusion in a subset of the reference devices. For example, the device may undergo state changes during the period of time, such as being turned on and off. Data indicating the occurrence of these state changes, the character of the state changes, such as transitioning from on to off or from off to on, and/or the time of day and/or day of the week of the state changes may be identified, determined, and/or generated and stored, such as in data store(s). A training component may utilize this usage-pattern data to determine the usage pattern of the device over the period of time.

By way of example and not as a limitation, the training component may identify, determine, and/or generate usage-pattern data indicating that, for a smart door lock accessory device associated with a given user account, the device is transitioned from a "locked" state to an "unlocked" state at or around 6:30 am on weekdays 90% of the time, then the device is transitioned from the "unlocked" state to the "locked" state at or around 6:32 am on weekdays 93% of the time, then the device is transitioned from the "locked" state to the "unlocked" state at or around 5:30 pm on weekdays 95% of the time, and then the device is transitioned from the "unlocked" state to the "locked" state at or around 9:30 pm on weekdays 75% of the time. This usage pattern may be utilized for the analyses described herein.

Additionally, the training component may identify an initial group of reference devices from which to analyze reference usage patterns. In examples, the group of reference devices may be random, may include all or only a portion of accessory devices associated with the remote system, and/or may be selected using one or more criteria. For example, reference accessory devices may be identified as reference devices based at least in part on the geolocation of the devices, the device type such as light, plugin, lock, camera, etc., scheduling data associated with the reference accessory devices, and/or contextual data showing one or more similarities between the device and the reference devices and/or user accounts associated with the device and the reference devices. By way of example and not as a limitation, the training component may identify 1,000,000 reference devices based at least in part on the factors and/or criteria described above. Using an example provided herein, the device may be a smart light bulb. In examples, the training component may identify reference devices that have the same light bulb device type and/or that have similar device types such as a wall plugin and/or a lamp.

The training component may also identify, determine, and/or generate reference usage-pattern data for some or all of the reference devices. For example, similar to the device, the reference devices may be operated over the period of time and data indicating the transition of states for the reference devices may be identified, determined, and/or generated and stored. The training component may also determine a degree of similarity between the reference usage pattern of the individual ones of the reference devices and the usage pattern. When determining the usage similarity, the training component may be configured to take time zone differences into consideration and may generate adjusted usage-pattern data based at least in part on time zone differences between the device and one or more of the reference accessory devices. Using the example provided herein, the training component may identify the 1,000 reference devices with reference usage patterns that are most similar to the usage pattern of the device. Additionally, or alternatively, the training component may identify the reference devices, regardless of number, with reference usage patterns that have a degree of similarity that has at least a threshold degree of similarity with the usage pattern of the device.

Determining the degree of similarity between a usage pattern and a reference usage pattern may be performed by determining a difference in time from when a state transition occurs for the device and when a similar state transition occurs for the reference device. For example, if the target device has a usage pattern including a transition from off to on at 6:00 am, a reference usage pattern including a transition from off to on at 6:01 am may be considered more similar than a reference usage pattern including a transition from off to on at 6:20 am. Additionally, or alternatively, for a usage pattern showing a state transition at a given time and day occurring 95% of the time, a reference usage pattern showing a similar state transition at or around the time and on the day occurring 98% of the time may be considered more similar than a reference usage pattern showing a similar state transition occurring 93% of the time. When determining degrees of similarity, the training component may take into consideration holidays and/or days with atypical device usage, such as days when regional and/or worldwide events occur.

At block 804, the process 800 may include determining a first number of the subset of the reference devices in a first state at atime. For example, at a given time, a prediction component may identify and/or determine a state of some or all of the reference devices in the subset of the reference devices. In examples, a database, such as a database in the data store(s) and/or a user account may maintain the current state of reference devices and that database may be queried to identify the current state of the reference devices in the subset of reference devices. In the example utilized herein, the reference devices may be associated with either an "on" state or an "off" state. Using the database indicating the current state of devices, the prediction component may determine that a first number of the subset of the reference devices is in the "on" state.

At block 806, the process 800 may include determining a second number of the subset of the reference devices in a second state at the time. Determining the second number of the subset of the reference devices in a second state may be performed in the same or a similar manner as determining the first number.

At block 808, the process 800 may include determining, based at least in part on the first number and the second number, a probability value that the device should be in the first state. For example, based at least in part on the number of the reference devices that are in the "locked" state and the number of the reference devices that are in the "unlocked" state, the prediction component may determine a probability value that the device should be in a given state. Using the example provided herein, the prediction component may determine that there is a 98% probability that the device should be in the "locked" state at 10:00 pm on the Wednesday in question. In examples, the prediction component may be configured to weight the current state of the reference devices based at least in part on the similarity scores associated with the reference devices. In these examples, reference devices having more favorable similarity scores may be weighted more than reference devices having less favorable similarity scores.

The process 800 may additionally, or alternatively, include receiving an indication that the device is in the second state and determining that the probability value is at least a threshold probability value. The process 800 may also include generating, based at least in part on the probability value being at least the threshold probability value, notification data associated with a notification that the device is in the second state instead of the first state and sending the notification data to a mobile device associated with the device. The process 800 may also include receiving, from the mobile device, input data indicating a request to transition the device from the second state to the first state and sending an instruction configured to cause the device to transition from the second state to the first econd state based at least in part on the request.

The process 800 may additionally, or alternatively, include receiving, from a voice-enabled device and during a time period, audio data representing a user utterance and determining, based at least in part on the audio data, intent data indicating an intent to operate a target device. The process 800 may also include determining, based at least in part on the probability value, that the device is operated during the time period and identifying the device as the target device based at least in part on determining that the device is operated during the time period.

The process 800 may additionally, or alternatively, include receiving an indication that an away mode is being configured for use and determining, based at least in part on the reference usage-pattern data, scheduling data representing a schedule for transitioning the device between the first state and the second state over a second period of time. The process 800 may also include generating recommendation data indicating a recommendation to configure the away mode using the schedule and sending the recommendation data to a mobile device associated with the device. The process 800 may also include receiving, from the mobile device, input data representing an acceptance of the recommendation and causing the away mode to be configured using the schedule based at least in part on the input data.

The process 800 may additionally, or alternatively, include identifying a device type associated with the device and identifying the reference devices based at least in part on the reference devices being associated with the device type. In these examples, some or all of the reference devices may be associated with one or more user accounts other than the user account associated with the device. The process 800 may also include determining reference usage-pattern data indicating the reference usage pattern of the individual ones of the reference devices.

The process 800 may additionally, or alternatively, include identifying the reference devices based at least in part on contextual data indicating that the device is associated with a geographic region and the reference devices are associated with the geographic region. In these examples, the process 800 may include determining reference usage-pattern data indicating the reference usage pattern of the individual ones of the reference devices.

The process 800 may additionally, or alternatively, include receiving, from a voice-enabled device associated with the device, audio data representing a user utterance and determining, based at least in part on the audio data, intent data indicating an intent to operate devices associated with a device group. The process 800 may also include determining that the device is unassociated with the device group and determining, based at least in part on the probability value, that the first device is a candidate for association with the device group. The process 800 may also include sending recommendation data representing a request to associate the device with the device group.

The process 800 may additionally, or alternatively, include determining a time of day representative of when device operation within a space ceases. This determination may be based at least in part on historical device-usage data and/or based at least in part on the current state prediction analyses described herein. The process 800 may also include storing device-group data indicating one or more devices in a device group to be operated upon at the time of day and determining that a given device is unassociated with the device group. The process 800 may also include determining, based at least in part on the probability value, that the device is a candidate for association with the device group and sending recommendation data representing a request to associate the device with the device group.

Figure 9:
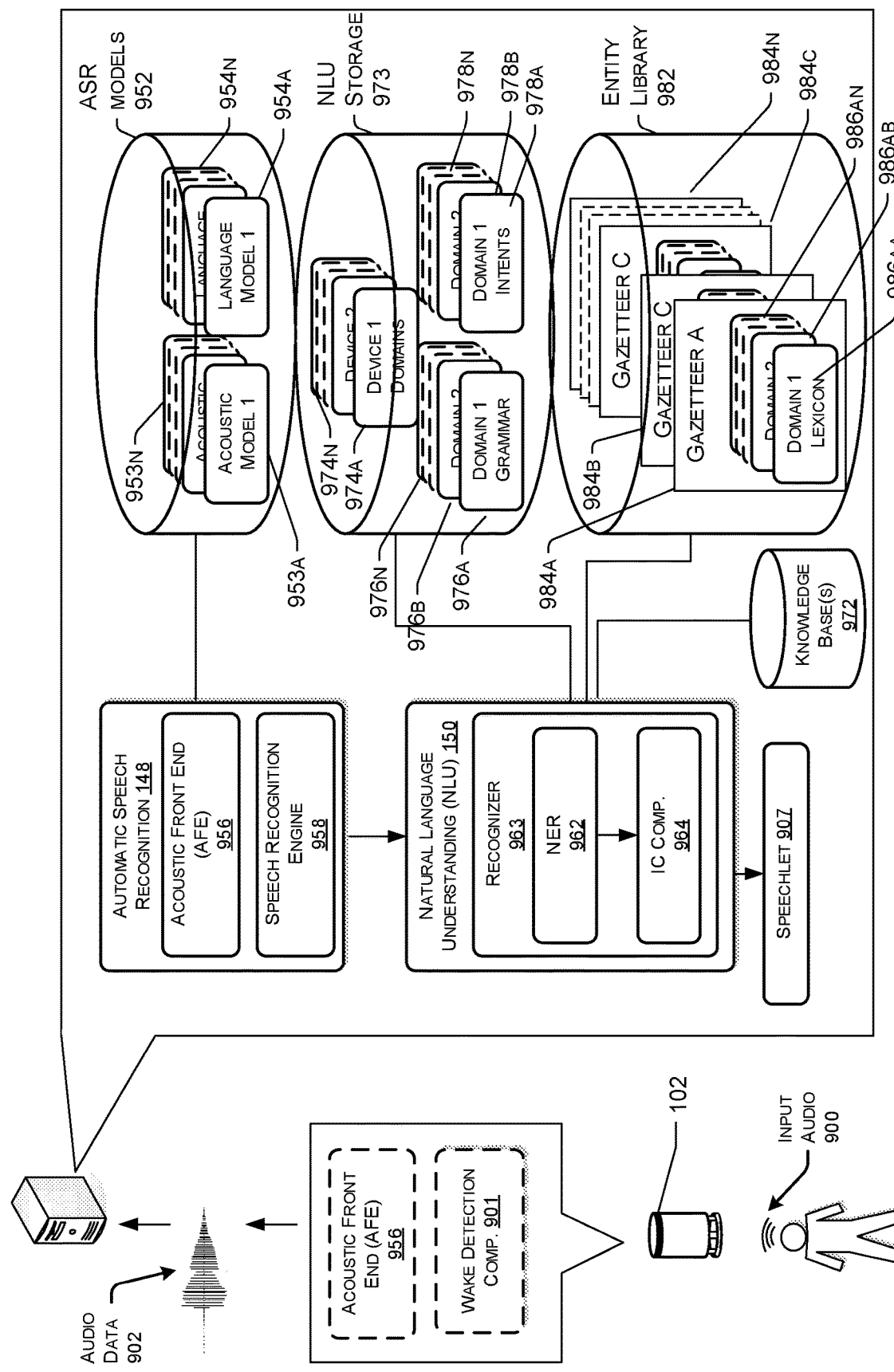
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 110). The various components illustrated may be located on a same or different physical devices. Message between various components illustrated in FIG. 9 may occur directly or across a network 112. An audio capture component, such as a microphone 118 of the device 102, or another device, captures audio 900 corresponding to a spoken utterance. The device 102, using a wakeword detection component 901, then processes audio data corresponding to the audio 900 to determine if a keyword (such as a wakeword) is detected in the audio data. Following detection of a wakeword, the device 102 sends audio data 902 corresponding to the utterance to the remote system 110 that includes an ASR component 148. The audio data 902 may be output from an optional acoustic front end (AFE) 956 located on the device prior to transmission. In other instances, the audio data 902 may be in a different form for processing by a remote AFE 956, such as the AFE 956 located with the ASR component 148 of the remote system 110.

The wakeword detection component 901 works in conjunction with other components of the user device, for example a microphone to detect keywords in audio 900. For example, the device may convert audio 900 into audio data, and process the audio data with the wakeword detection component 901 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 902 corresponding to input audio 900 to the remote system 110 for speech processing. Audio data corresponding to that audio may be sent to remote system 110 for routing to a recipient device or may be sent to the remote system 110 for speech processing for interpretation of the included speech (either for purposes of enabling voice-messages and/or for purposes of executing a command in the speech). The audio data 902 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 110, an ASR component 148 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability value or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 148 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 110 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on lights." The wake detection component may identify the wake word, otherwise described as a trigger expression, "Alexa," in the user utterance and may "wake" based on identifying the wake word. Audio data corresponding to the user utterance may be sent to the remote system 110, where the speech recognition engine 958 may identify, determine, and/or generate text data corresponding to the user utterance, here "turn on lights."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 110, for natural language understanding (NLU) processing, such as conversion of the text into commands for execution, either by the user device, by the remote system 110, or by another device (such as a server running a specific application like a search engine, etc.).

The device performing NLU processing 150 (e.g., server 110) may include various components, including potentially dedicated processor(s), memory, storage, etc. As shown in FIG. 9, an NLU component 150 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 148 based on the utterance input audio 900) and attempts to make a semantic interpretation of the text. That is, the NLU process determines the meaning behind the text based on the individual words and then implements that meaning. NLU processing 150 interprets a text string to derive an intent or a desired action from the user as well as the pertinent pieces of information in the text that allow a device (e.g., device 102) to complete that action. For example, if a spoken utterance is processed using ASR 148 and outputs the text "turn on lights" the NLU process may determine that the user intended to establish to operate or otherwise turn on one or more devices with a naming indicator of "lights."

The NLU may process several textual inputs related to the same utterance. For example, if the ASR 148 outputs N text segments (as part of an N-best list), the NLU may process all N outputs to obtain NLU results.

As will be discussed further below, the NLU process may be configured to parse and tag to annotate text as part of NLU processing. For example, for the text "turn on office light," "turn on" may be tagged as a command (to activate a device) and "office light" may be tagged as the naming identifier of the device with which to activate.

To correctly perform NLU processing of speech input, an NLU process 150 may be configured to determine a "domain" of the utterance so as to determine and narrow down which services offered by the endpoint device (e.g., remote system 110 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 150 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a smart-home intent database may link words and phrases such as "turn on," "activate," "on," to a "turn on" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on office light" is an identified intent, a grammar (976) framework or frameworks may correspond to sentence structures such as "turn on {office light}."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "turn on office light," after failing to determine which device to operate, the NER component 962 may search the domain vocabulary for the phrase "office light". In the alternative, generic words may be checked before the gazetteer information, or both may be tried, potentially producing two different results.

The output data from the NLU processing (which may include tagged text, commands, etc.) may then be sent to a speechlet 907. The destination speechlet 907 may be determined based on the NLU output. For example, if the NLU output includes a command to send a message, the destination speechlet 907 may be a message sending application, such as one located on the user device or in a message sending appliance, configured to execute a message sending command. If the NLU output includes a search request, the destination speechlet 907 may include a search engine processor, such as one located on a search server, configured to execute a search command. After the appropriate command is generated based on the intent of the user, the speechlet 907 may provide some or all of this information to a text-to-speech (TTS) engine 152. The TTS engine 152 may then generate an actual audio file for outputting the audio data determined by the speechlet 907 (e.g., "okay," or "we couldn't find office light"). After generating the file (or "audio data"), the TTS engine may provide this data back to the remote system 110.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 150 during runtime operations where NLU operations are performed on text (such as text output from an ASR component 148). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 110 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 110, as illustrated herein are exemplary, and may be located in a stand-alone device or may be included, in whole or in part, as a component of a larger device or system, may be distributed across a network or multiple devices connected by a network, etc.

Figure 10:
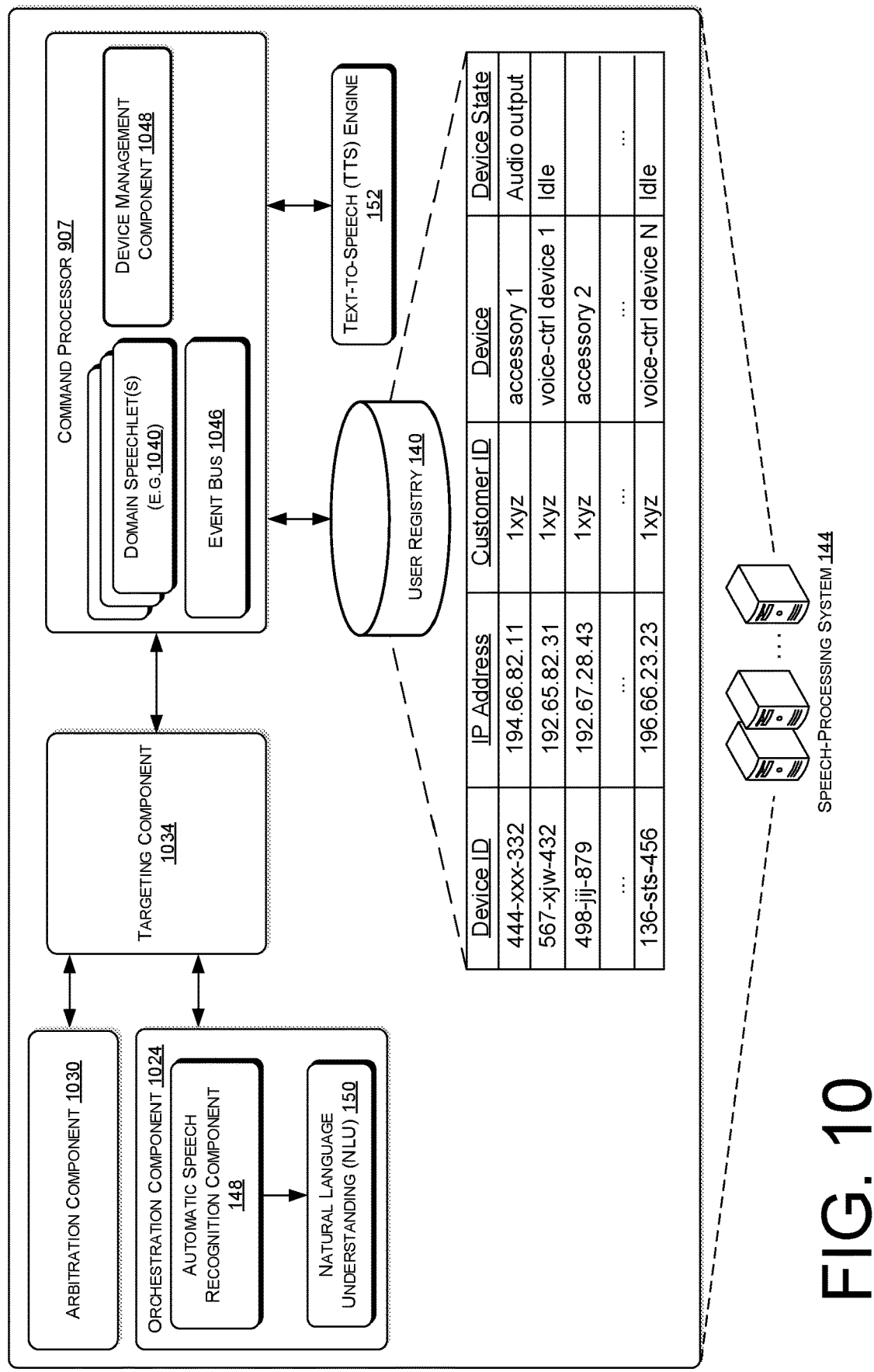
FIG. 10 illustrates a conceptual diagram of components of a speech-processing system for state prediction of devices.

FIG. 10 illustrates a conceptual diagram of components of a speech-processing system 144 associating audio output commands with multiple devices, including a speechlet 907 configured to generate a command that the selected voice-enabled device uses to respond to a user utterance. As used with respect to FIG. 10, a voice-enabled device may include a voice-enabled device 102, such as described with respect to FIG. 1. As illustrated in FIG. 10, the speech-processing system 144, including the orchestration component 1024 comprising the ASR component 148 and the NLU component 150, may be coupled to the targeting component 1034 and provide the targeting component 1034 with the intent determined to be expressed in the user utterance. Further, the arbitration component 1030 may provide the ranked list of devices to the targeting component 1034, as well as device indicators (e.g., IP addresses, devices names, etc.) for one or more of the voice-enabled devices in the ranked list of devices. The targeting component 1034 may then perform techniques to determine a target device (e.g., a device to perform the requested operation), and provide various data to the speechlet 907. For instance, the targeting component 1034 may provide the speechlet 907 with various device identifiers of the voice-enabled devices, the determined target device, the determined intent and/or command, etc.

The speechlet 907 and/or NLU component 150 may determine a domain based on the intent and, based on this determination, route the request corresponding to the audio data to the appropriate domain speechlet, such as the illustrated domain speechlets 1040. The domain speechlet 1040 may comprise any type of device or group of devices (e.g., hardware device, virtual devices or partitions, server, etc.), and may receive the text data and/or an intent associated with the audio signals and may determine how to respond to the request. For instance, the intent for a command "turn on study light" may be routed to a smart-home speechlet 164, which controls generation of directive data for sending to voice-enabled devices for outputting audio confirming that an accessory device with the naming indicator of "study light" has been activated.

Various types of domain speechlets 1040 may be used to determine which devices to send commands to and/or to use in response to a user utterance, as well as the appropriate response and potential additional content (e.g., audio data). For example, the domain speechlets 1040 may include a third party skills domain speechlet 1040, which may handle intents associated with gaming, productivity, etc., a music domain speechlet, which may handle intents associated with music play requests (e.g., Amazon Music, Pandora, Spotify, iHeart, etc.), and/or an information domain speechlet, which may handle requests for information associated, for example, with the status of a particular device and/or content being utilized and/or output by a particular device and/or group of devices.

After the domain speechlet 1040 generates the appropriate command, which may be described herein as directive data, based on the intent of the user, and/or provides additional content, such as audio data, to be output by one of the voice-enabled devices, the domain speechlet 1040 may provide this information back to the speech system 144, which in turns provides some or all of this information to a text-to-speech (TTS) engine 152. The TTS engine 152 then generates an actual audio file for outputting the second audio data determined by the domain speechlet 1040. After generating the file (or "audio data"), the TTS engine 152 may provide this data back to the speech system 144.

The speech system 144 may then publish (i.e., write) some or all of this information to an event bus 1046. That is, the speech system 144 may provide information regarding the initial request (e.g., the speech, the text, the domain/intent, etc.), the response to be provided to the voice-enabled device, or any other information pertinent to the interaction between the voice-enabled device and the speech-processing system 144 to the event bus 1046.

Within the speech-processing system 144, one or more components or services may subscribe to the event bus 1046 so as to receive information regarding interactions between user devices and the speech-processing system 144. In the illustrated example, for instance, the device management component 1048 may subscribe to the event bus 1046 and, thus, may monitor information regarding these interactions. In some examples, monitoring information in the event bus 1046 may comprise messages between various components of the speech-processing system 144. For example, the targeting component 1034 may monitor the event bus 1046 to identify device state data for voice-enabled devices. In some examples, the event bus 1046 may "push" or send indications of events and/or device state data to the targeting component 1034. Additionally, or alternatively, the event bus 1046 may be "pulled" where the targeting component 1034 sends requests to the event bus 1046 to provide an indication of device state data for a voice-enabled device. The event bus 1046 may store indications of the device states for the devices, such as in a database (e.g., user registry 140), and using the stored indications of the device states, send the device state data for voice-enabled devices to the targeting component 1034. Thus, to identify device state data for a device, the targeting component 1034 may send a request to the event bus 1046 (e.g., event component) to provide an indication of the device state data associated with a device, and receive, from the event bus 1046, the device state data that was requested.

The device management component 1048 functions to monitor information published to the event bus 1046 and identify events that may trigger action. For instance, the device management component 1048 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 1048 may reference the user registry 140 to determine which voice-enabled devices are associated with secondary devices, as well as determine device types, states, and other capabilities of these secondary devices. For instance, the device management component 1048 may determine, from the information published to the event bus 1046, an identifier associated with the voice-enabled device making the corresponding request or the voice-enabled device selected to respond to or act upon the user utterance. The device management component 1048 may use this identifier to identify, from the user registry 140, a user account associated with the voice-enabled device. The device management component 1048 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 1048 may determine whether a particular event identified is associated with supplemental content. That is, the device management component 1048 may write, to a datastore, indications of which types of events and/or which primary content or responses are associated with supplemental content. In some instances, the speech-processing system 144 may provide access to third-party developers to allow the developers to register supplemental content for output on secondary devices for particular events and/or primary content. For example, if a voice-enabled device is to output that the weather will include thunder and lightning, the device management component 1048 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1048 may store an association between the primary response or content (e.g., outputting of information regarding the world's largest mammal) and corresponding supplemental content (e.g., the audio data, image data, or the like). In some instances, the device management component 1048 may also indicate which types of secondary devices are to output which supplemental content. For instance, in the instant example, the device management component 1048 may store an indication that secondary devices of a class type "tablet" are to output a picture of a blue whale. In these and other instances, meanwhile, the device management component 1048 may store the supplemental content in association with secondary-device capabilities (e.g., devices with speakers output the audio commentary, devices with screens output the image, etc.).

The device management component 1048 may also determine how to transmit response and/or supplement content (and/or information acquiring the content) to the voice-enabled devices and/or the secondary devices. To make this determination, the device management component 1048 may determine a device type of the voice-enabled devices and/or secondary devices, capabilities of the device(s), or the like, potentially as stored in the user registry 140. In some instances, the device management component 1048 may determine that a particular device is able to communicate directly with the speech-processing system 144 (e.g., over WiFi) and, thus, the device management component 1048 may provide the response and/or content directly over a network 112 to the secondary device (potentially via the speech system 144). In another example, the device management component 1048 may determine that a particular secondary device is unable to communicate directly with the speech-processing system 144, but instead is configured to communicate with a voice-enabled device in its space over short-range wireless networks. As such, the device management component 1048 may provide the supplement content (or information) to the speech system 144, which in turn may send this to the voice-enabled device, which may send the information over a short-range network to the secondary device.

The speech-processing system 144 may further include the user registry 140 that includes data regarding user profiles as described herein. The user registry 140 may be located part of, or proximate to, the speech-processing system 144, or may otherwise be in message with various components, for example over the network 112. The user registry 140 may include a variety of information related to individual users, accounts, etc. that interact with the voice-enabled devices, and the speech-processing system 144. For illustration, the user registry 150 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 140 may store indications of associations between various voice-enabled devices and/or secondary device, such as virtual clusters of devices, states of devices, and associations between devices and audio-session queues. The user registry 140 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the speechlet 907 and/or the domain speechlets 1040 may determine, based on the stored device states in the user registry 140, a current device state of the voice-enabled devices. Rather than receiving device states for the voice-enabled devices, in metadata, the device states may already have been determined or received and stored in the user registry 140. Further, the user registry 140 may provide indications of various permission levels depending on the user. As an example, the speech system 144 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 1046 may publish different events which indicate device states to various entities or components that subscribe to the event bus 1046. For instance, if an event of "turn on office lights" occurs for a voice-enabled device, the event bus 1046 may publish the indication of this event, and thus the device state of the voice-enabled device from which the audio data was received may be determined. Thus, various components, such as the targeting component 1034, may be provided with indications of the various device states via the event bus 1046. The event bus 1046 may further store and/or update device states for the voice-enabled devices in the user registry 140. The components of the speech-processing system 144 may query the user registry 140 to determine device states.

A particular user profile may include a variety of data that may be used by the system 144. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
   identifying a device type associated with a device, the device associated with first account data, the device type associated with device states of the device;
   selecting a subset of reference devices based at least in part on:
   the subset of reference devices being associated with the device type, the subset of reference devices associated with second account data related to a group of users that differs from a user associated with the first account data, the subset of reference devices being situated in environments that differ from an environment of the device; and for a reference device of the subset of reference devices, a degree of similarity between a reference usage pattern and a usage pattern associated with the device;

determining a ratio of devices associated with the subset of the reference devices, the ratio indicating:
a first number of the subset of reference devices in a first state at a time; and
determining a second number of the subset of reference devices in a second state at the time; and generating a recommendation indicating a schedule for performing actions, at one or more future times, wherein the schedule is generated based at least in part on the ratio of (1) the subset of reference devices that are associated with the second account data that are in the first state to (2) the subset of reference devices that are associated with the second account data that are in the second state.

2. The method of claim 1, further comprising:
receiving an indication that the device is in the second state;
determining that a probability value that the device should be in the first state is at least a threshold probability value;
generating, based at least in part on the probability value being at least the threshold probability value, notification data associated with a notification that the device is in the second state instead of the first state; and
sending the notification data to a personal device associated with the device.

3. The method of claim 1, wherein the device comprises a first device, and the method further comprises:
receiving, from a second device and during a time period including the time, audio data representing a user utterance;
determining, based at least in part on the audio data, intent data indicating an intent to operate a target accessory device;
determining, based at least in part on a probability value that the device should be in the first state, that the first device is operated during the time period; and
identifying the first device as the target accessory device based at least in part on determining that the first device is operated during the time period.

4. The method of claim 1, further comprising:
determining, based at least in part on the reference usage pattern, scheduling data for transitioning the device between the first state and the second state over a period of time;
generating data, using the scheduling data, indicating a mode for the device; and
sending the data to a personal device associated with the device.

5. The method of claim 1, wherein the device is associated with the first account data, and the method further comprises selecting the subset of reference devices based at least in part on the subset of reference devices being associated with the first account data.

6. The method of claim 1, further comprising selecting the subset of reference devices based at least in part on contextual data indicating that the device is associated with a geographic region and the subset of reference devices are associated with the geographic region.

7. The method of claim 1, further comprising:
determining a time of day representative of when device operation within a space ceases;
storing device-group data indicating one or more devices in a device group to be operated upon at the time of day;
determining that the device is unassociated with the device group;
determining, based at least in part on a probability value that the device should be in the first state, that the device is a candidate for association with the device group; and
sending data representing a request to associate the device with the device group.

8. The method of claim 1, further comprising determining a geolocation associated with the device, wherein the subset of reference devices is associated with the geolocation.

9. The method of claim 5, further comprising determining to transition the device to the first state based at least in part on a probability value that the device should be in the first state.

10. The method of claim 1, further comprising:
generating a similarity score between the reference usage pattern and the usage pattern;
determining that the similarity score satisfies a threshold similarity score; and
wherein identifying the reference device for inclusion in the subset of reference devices is based at least in part on the similarity score satisfying the threshold similarity score.

11. A system comprising:
one or more processors; and
computer-readable media storing computer-executable instructions that, when executed by the one or more processors, cause the one or more processors to perform operations comprising:
identifying a device type associated with a device, the device associated with first account data, the device type associated with device states of the device;
identifying a subset of reference devices based at least in part on:
the subset of reference devices being associated with the device type, the subset of reference devices associated with second account data related to a group of users that differs from a user associated with the first account data, the subset of reference devices being situated in environments that differ from an environment of the device; and
for a reference device of the subset of reference devices, a degree of similarity between a reference usage pattern and a usage pattern associated with the device;
determining a ratio of devices associated with the subset of the reference devices, the ratio indicating:
a first number of the subset of reference devices in a first state at a time; and
a second number of the subset of reference devices in a second state at the time; and
generating a recommendation indicating a schedule for performing actions, at one or more future times, wherein the schedule is generated based at least in part on the ratio of (1) the subset of reference devices that are associated with the second account data that are in the first state to (2) the subset of reference devices that are associated with the second account data that are in the second state.

12. The system of claim 11, the operations further comprising:
- receiving an indication that the device is in the second state;
- determining that a probability value that the device should be in the first state is at least a threshold probability value;
- generating, based at least in part on the probability value being at least the threshold probability value, notification data associated with a notification that the device is in the second state instead of the first state; and
- sending the notification data to a personal device associated with the device.

13. The system of claim 11, wherein the device comprises a first device, and the operations further comprise:
- receiving, from a second device and during a time period including the time, audio data representing a user utterance;
- determining, based at least in part on the audio data, intent data indicating an intent to operate a target accessory device;
- determining, based at least in part on a probability value that the device should be in the first state, that the first device is operated during the time period; and
- identifying the first device as the target accessory device based at least in part on determining that the first device is operated during the time period.

14. The system of claim 11, the operations further comprising:
- determining, based at least in part on the reference usage pattern, scheduling data for transitioning the device between the first state and the second state over a period of time;
- generating data, using the scheduling data, indicating a mode for the device; and
- sending the data to a personal device associated with the device.

15. The system of claim 11, wherein the device is associated with the first account data, and the operations further comprise identifying the subset of reference devices based at least in part on the subset of reference devices being associated with the first account data.

16. The system of claim 11, the operations further comprising identifying the subset of reference devices based at least in part on contextual data indicating that the device is associated with a geographic region and the subset of reference devices are associated with the geographic region.

17. The system of claim 11, the operations further comprising:
- determining a time of day representative of when device operation within a space ceases;
- storing device-group data indicating one or more devices in a device group to be operated upon at the time of day;
- determining that the device is unassociated with the device group;
- determining, based at least in part on a probability value that the device should be in the first state, that the device is a candidate for association with the device group; and
- sending data representing a request to associate the device with the device group.

18. A system comprising:
- one or more processors; and
- computer-readable media storing computer-executable instructions that, when executed by the one or more processors, cause the one or more processors to perform operations comprising:
  - identifying a device type associated with a device, the device associated with first account data, the device type associated with device states of the device;
  - identifying a subset of reference devices based at least in part on:
    - the subset of reference devices being associated with the device type, the subset of reference devices associated with second account data related to a group of users that differs from a user associated with the first account data, the subset of reference devices being situated in environments that differ from an environment of the device; and
    - for a reference device of the subset of reference devices, a reference usage pattern and a usage pattern associated with the device;
  - determining a ratio of devices associated with the subset of the reference devices, the ratio indicating:
    - a first number of the subset of reference devices in a first state at a time; and
    - determining a second number of the subset of reference devices in a second state at the time; and
  - generating a recommendation indicating a schedule for performing actions, at one or more future times, wherein the schedule is generated based at least in part on the ratio of (1) the subset of reference devices that are associated with the second account data that are in the first state to (2) the subset of reference devices that are associated with the second account data that are in the second state.

19. The system of claim 18, the operations further comprising:
- receiving an indication that the device is in the second state;
- generating, based at least in part on determining that the device should be in the first state, notification data indicating the device is in the second state instead of the first state; and
- sending the notification data to a personal device associated with the device.

20. The system of claim 18, the operations further comprising:
- determining, based at least in part on the reference usage pattern, scheduling data for transitioning the device between the first state and the second state;
- generating, based at least in part on the scheduling data, data for transitioning states of the device using the schedule; and
- sending the data to a personal device associated with the device.

* * * * *